(12) United States Patent
Craighead

(10) Patent No.: US 6,952,206 B1
(45) Date of Patent: Oct. 4, 2005

(54) GRAPHICS APPLICATION PROGRAM INTERFACE SYSTEM AND METHOD FOR ACCELERATING GRAPHICS PROCESSING

(75) Inventor: Matthew Craighead, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 330 days.

(21) Appl. No.: 10/218,091

(22) Filed: Aug. 12, 2002

(51) Int. Cl.$^7$ ................................................. G06T 15/40
(52) U.S. Cl. ...................... 345/422; 345/421; 345/426; 345/428; 345/619; 345/622; 345/629
(58) Field of Search ............................... 345/421, 422, 345/426, 428, 619, 622, 629, 768

(56) References Cited

U.S. PATENT DOCUMENTS

| | | | | |
|---|---|---|---|---|
| 5,751,291 A | * | 5/1998 | Olsen et al. | 345/422 |
| 6,042,235 A | * | 3/2000 | Machtig et al. | 353/28 |
| 6,046,747 A | * | 4/2000 | Saunders et al. | 345/582 |
| 6,727,899 B2 | * | 4/2004 | Hoffman et al. | 345/421 |
| 6,731,304 B2 | * | 5/2004 | Sowizral et al. | 345/622 |

OTHER PUBLICATIONS

Bartz et al. "Extending Graphics Hardware For Occlusion Queries In OpenGL", ACM 1998, pp. 97–104.*
"SGIX_instruments", http://oss.sgi.com/projects/ogl-sample/registry/SGIX/instruments.txt, Sep. 18, 1997.
"GL$_{13}$ HP_occlusion_test", Nvidia Corporation, No Date Available.
"GL$_{13}$ HP_visibility_test", Nvidia Corporation, No Date Available.

* cited by examiner

Primary Examiner—Kimbinh T. Nguyen
(74) Attorney, Agent, or Firm—Zilka-Kotab, PC

(57) ABSTRACT

A system, method and computer program product are provided for accelerating graphics processing utilizing a graphics application program interface. Initially, graphics data is processed in a graphics system with components including a central processing unit, a geometry processing module, and a pixel processing module. In use, the graphics application program interface accepts one or more first occlusion queries followed by a second occlusion query. The second occlusion query is at least partially processed by the graphics system before a final result of any one of the first occlusion queries is computed by the graphics system.

72 Claims, 17 Drawing Sheets

"A" Previous Layer

"B" Additional Present Layer

GRAPHICS APPLICATION PROGRAM INTERFACE SYSTEM AND METHOD FOR ACCELERATING GRAPHICS PROCESSING

FIELD OF THE INVENTION

The present invention relates to computer graphics, and more particularly to graphics application program interfaces.

BACKGROUND OF THE INVENTION

Graphics application program interfaces (APIs) have been instrumental in allowing applications to be written to a standard interface and to be run on multiple platforms, i.e. operating systems. Examples of such graphics API's include the Open Graphics Library (OpenGL®) and Direct3D™. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports the OpenGL® standard, the operating system(s) and application software programs can make calls according to the standard, without knowing any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API.

While many benefits have been derived from the use of graphics API's, there unfortunately are still numerous drawbacks and shortcomings in the many available graphics API's which require improvement.

By way of example, most APIs introduce "breaks," or pauses, in processing among components of a graphics pipeline. One particular situation where this may arise is in the context of occlusion culling APIs. Occlusion culling APIs like the HP_occlusion_test extension define a mechanism whereby an application can query the visibility of an object, where "visible" means that at least one fragment passes the depth and stencil tests.

APIs like the HP_occlusion_test extension employ a simple "stop-and-wait" model for handling multiple occlusion queries. The application begins an occlusion test and ends it. Subsequently, at some later point, the application asks for the result, at which point the driver must stop and wait until the result from that test is returned before the application can begin the next test. This is a very simple model, but the resulting performance is mediocre when an application performs many queries, because it eliminates most of the opportunities for parallelism between a central processing unit and graphics hardware.

There is thus a need to provide a graphics API that overcomes such problems in the context of occlusion testing.

DISCLOSURE OF THE INVENTION

A system, method and computer program product are provided for accelerating graphics processing utilizing a graphics application program interface. Initially, graphics data is processed in a graphics system with components including a central processing unit, a geometry processing module, and a pixel processing module. In use, the graphics application program interface accepts one or more first occlusion queries followed by a second occlusion query. The second occlusion query is at least partially processed by the graphics system before a final result of any one of the first occlusion queries is computed by the graphics system.

In one embodiment, such graphics system is interfaced with the graphics application program interface in order to prevent breaks in the processing of the graphics data in the components of the graphics system by accepting a plurality of occlusion queries before returning a result of any one of the occlusion queries.

In another embodiment, the graphics application program interface may process a plurality of the occlusion queries. Such occlusion queries each may include rendering a bounding volume. Still yet, writes to a frame buffer may be disabled prior to the processing of the occlusion queries. Moreover, writes to the frame buffer may be enabled after the processing of the occlusion queries.

In another embodiment, visibility information may be tracked utilizing the graphics application program interface. Such visibility information may include a number of visible pixels, a number of visible samples, a number of visible triangles, a number of visible polygons, a number of visible front-facing polygons, etc. In use, the visibility information associated with an object may be compared with a predetermined threshold. As an option, the object may be conditionally rendered based on the comparison. Further, a type of visibility information (e.g. visible pixels, visible samples, etc.) may be selected.

In still yet another embodiment, a level-of-detail may be selected based on the visibility information. Moreover, an object associated with the visibility information may be rendered at the selected level-of-detail.

Optionally, a bounding volume may be rendered. Such rendering may be terminated early based on a threshold. Still yet, the rendering may be terminated based on a comparison involving the threshold and visibility information tracked utilizing the graphics application program interface.

In another embodiment, a parameter to which the threshold may be applied can be selected. Still yet, the rendering may be part of a depth peeling operation. For example, the rendering may include collecting a plurality of constraining depth layers, rendering a scene, performing multiple tests involving the constraining depth layers and results of rendering the scene, collecting information about at least one depth layer utilizing the multiple tests, and utilizing the information relating to the one or more depth layers. Moreover, the rendering may include collecting information relating to a plurality of constraining depth layers, collecting information relating to at least one additional depth layer, and utilizing the information relating to the constraining depth layers and the information relating to the one or more additional depth layers to improve processing in the graphics pipeline.

In yet another embodiment, the graphics application program interface may be used to generate an effect based on visibility information. Moreover, the graphics application program interface may be used to perform the occlusion queries, where the results of the occlusion queries are used as a condition for generating the effect. Such effect may include a lens flare. In such case, the lens flare may be modulated based on the visibility information. Still yet, the effect may include a halo around a light source. Such halo may be modulated based on the visibility information.

In still yet another embodiment, a visible object list may be maintained which indicates which of a plurality of objects are visible during the processing utilizing a graphics application program interface, as well as the order in which said objects should be drawn. In use, objects may be added to the visible object list based on visibility information tracked utilizing the graphics application program interface. Further, objects may be removed from the visible object list based on visibility information tracked utilizing the graphics application program interface. Also, objects may be reordered in the visible object list based on information tracked utilizing the graphics application program interface. As such, the objects may be rendered during multiple rendering passes utilizing the visible object list.

Another aspect is provided for accelerating graphics processing utilizing a graphics application program interface. Initially, a first set of graphics commands is received from a computer program. The first set corresponds to a first occlusion query and is processed in a hardware graphics pipeline. After receiving the first set, a second set of graphics commands is received from the computer program. The second set corresponds to a second occlusion query and is processed in the hardware graphics pipeline. Still yet, a third set of graphics commands is received after the second set. The third set is at least partially processed in the hardware graphics pipeline before a result for the first occlusion query is determined. Next, the result for the first occlusion query and a result for the second occlusion query are saved. The saved results are accessible by the computer program.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
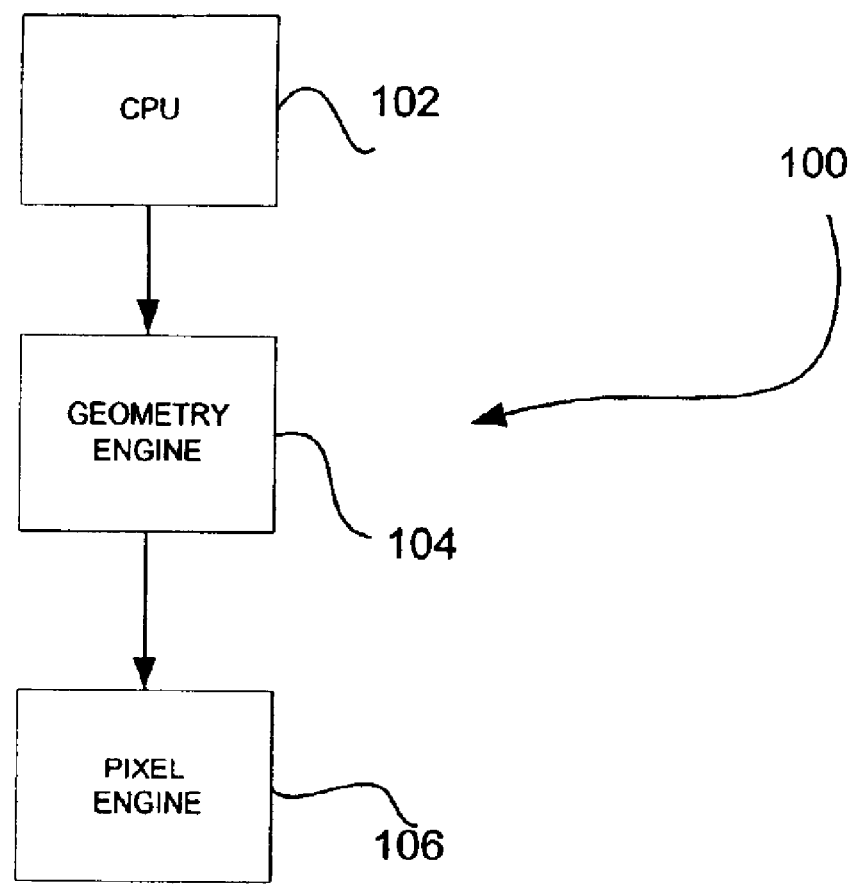
FIG. 1 illustrates the internal structure of one exemplary embodiment of a hardware graphics pipeline.

FIG. 1 illustrates the internal structure 100 of one exemplary embodiment of a hardware graphics pipeline. As shown, a central processing unit 102 is coupled to a geometry processing module 104. In use, the geometry processing module 104 receives instructions from the central processing unit 102, and transforms primitives into a screen-aligned coordinate system, accordingly. Other computations may be performed by the geometry processing module 104 such as lighting to determine the visual properties (e.g., color, surface normal, texture coordinates) of each vertex describing the primitives.

The transformed and lit vertices form the input to a pixel processing module 106. Such pixel processing may range from computing a fragment for each pixel covered by each of the primitives, various depth testing, etc. More information regarding the operation of the pixel processing module 106 will be set forth in greater detail during reference to a more detailed embodiment set forth in FIG. 2.

Figure 2:
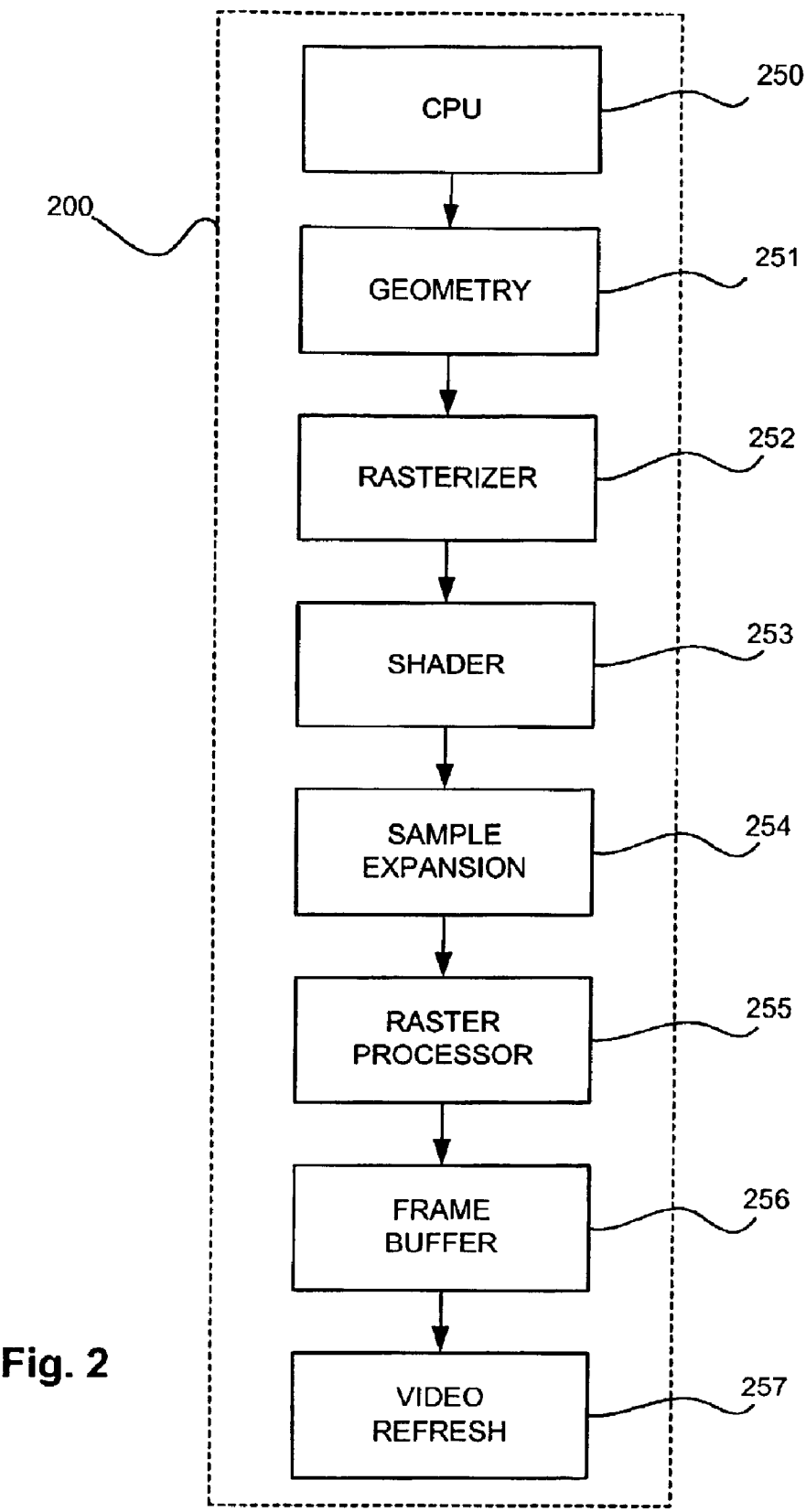
FIG. 2 illustrates a more detailed diagram showing the internal structure of one exemplary embodiment of a hardware graphics pipeline.

FIG. 2 illustrates a more detailed diagram showing the internal structure 200 of one exemplary embodiment of a hardware graphics pipeline. As shown, a geometry stage 251 is coupled to a central processing unit 250 for transforming primitives into a screen-aligned coordinate system. Other computations may be performed by the geometry stage 251 such as lighting to determine the visual properties (e.g., color, surface normal, texture coordinates) of each vertex describing the primitives, similar to the aforementioned geometry processing module.

The transformed vertices form the input for a rasterizer 252. The rasterizer 252 computes a fragment for each pixel covered by each of the primitives. A coverage mask stored with the fragment indicates which portions of the pixel the fragment covers.

Also included is a shader 253 that computes the final fragment, e.g. by applying texture maps or shader programs to the fragment. A sample expansion stage 254 then optionally generates multiple samples for each fragment.

With continuing reference to FIG. 2, after multi-sampling, the individual samples are sent to a raster-processor (ROP) 255 as if they were regular fragments. The raster-processor 255 performs various operations on the fragments, including z/stencil testing and color or alpha blending. This may require the raster-processor 255 to read a frame buffer memory 256 in order to retrieve the destination z-values or the destination color. To this end, the final pixel color and z-values are written back to the frame buffer memory 256.

When all primitives in the scene have been rendered in this manner, the contents of the frame buffer memory 256 are scanned out by a video refresh unit 257 and sent to a display (not shown).

As an option, the geometry processing module 104 and the pixel processing module 106 may include software run on separate programmable processors, or the same programmable processor. Moreover, the geometry processing module 104 and the pixel processing module 106 may include hardware.

In one embodiment, all of the foregoing components may be situated on a single semiconductor platform. Of course, the various modules may also be situated separately or in various combinations of semiconductor platforms per the desires of the user.

In the present description, a single semiconductor platform may refer to a sole unitary semiconductor-based integrated circuit or chip. It should be noted that the term single semiconductor platform may also refer to multi-chip modules with increased connectivity which simulate entirely on-chip operation, and make substantial improvements over utilizing a conventional CPU and bus implementation.

An interface may be used in conjunction with the various components set forth in FIGS. 1 and 2. In one embodiment, such interface may include at least in part the Open Graphics Library (OpenGL®), Direct3D™ application program interfaces (APIs), a proprietary application program interface, or the like. OpenGL® is the computer industry's standard application program interface (API) for defining 2-D and 3-D graphic images. OpenGL® and Direct3D™ APIs are commonly known to those of ordinary skill, and more information on the same may be found by reference to the OpenGL® Specification Version 1.3 which is incorporated herein by reference in its entirety.

In use, breaks in processing among the various components (i.e. central processing unit, geometry processing module, pixel processing module, etc.) of the internal structures shown in FIGS. 1 and 2 may result in decreased performance. As mentioned earlier in the background, such breaks may occur during occlusion testing.

In accordance with one embodiment, the interface may be equipped with the ability to accelerate graphics processing by avoiding the aforementioned breaks. This is accomplished by accepting a plurality of occlusion queries before returning a result of any one of the occlusion queries. More information will now be set forth regarding various implementations of the foregoing functionality in the context of an occlusion testing interface.

Figure 3:
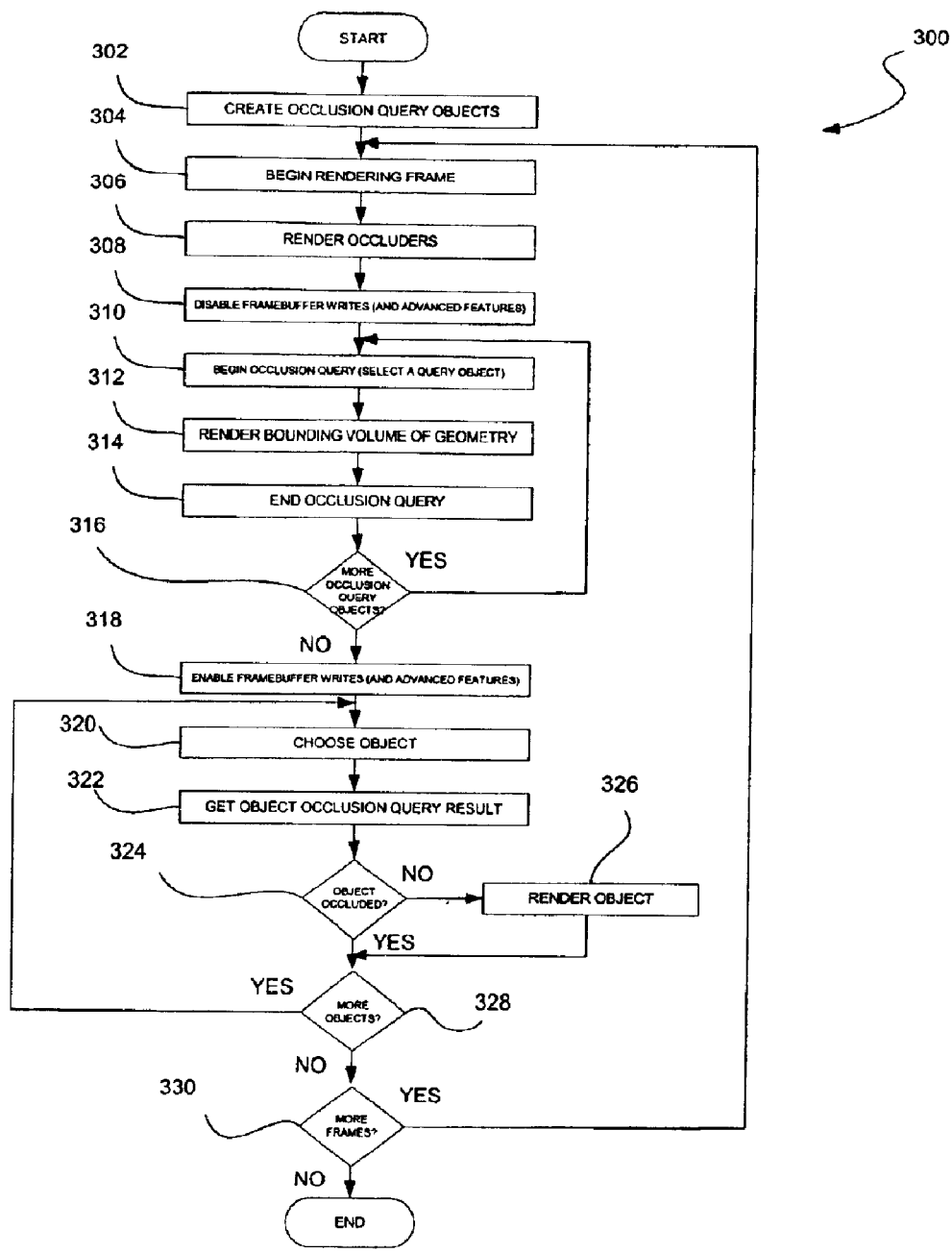
FIG. 3 illustrates a method for accelerating graphics processing utilizing a graphics application program interface in conjunction with a hardware graphics pipeline, in accordance with one embodiment.

FIG. 3 illustrates a method 300 for accelerating graphics processing utilizing a graphics application program interface in conjunction with a hardware graphics pipeline, in accordance with one embodiment. As an option, the present method 300 may be implemented in the context of the foregoing architecture of FIGS. 1 and 2. Of course, the method 300 may be implemented in any desired context.

The present method 300 provides such acceleration by processing a plurality of occlusion queries before returning a result of any one of the occlusion queries, in a manner that will soon become apparent. In use, various objects may be conditionally rendered based on whether the associated occlusion query result indicates that they are visible or not.

Initially, a plurality of occlusion query objects are created. Note operation 302. Next, in operation 304, frame rendering is begun, during which a plurality of occluder objects of a frame are rendered in operation 306. Occluder objects include objects which are known to obstruct or reside closer than other objects. Writes (i.e. color/depth writes) to a frame buffer are then disabled in operation 308 in preparation for occlusion queries. As shown, other advanced features (i.e. texturing, vertex programs, per-pixel math, etc.) may also be disabled in operation 308. Such disabling may be accomplished using any desired, predetermined command.

At this point, in operation 310, an occlusion query is begun by selecting an object. In the context of the present description, an occlusion query includes any technique of determining the visibility of an object. An object is generally comprises many geometric primitives (e.g., triangles) and possibly other objects.

Next, the occlusion query is carried out by rendering a bounding volume of geometry in operation 312 for providing an indication of object visibility. This rendering is conducted since, for the cost of rendering a bounding volume, the rendering of a normal object may possibly be avoided, as will soon become apparent.

In operation 314, the occlusion query is ended, after which it is determined whether additional objects exist. Note decision 316. Based on the outcome of decision 316, operations 310–314 may be repeated for each of a plurality of objects.

As is now apparent, the graphics application program interface is capable of accepting one or more first occlusion queries followed by a second occlusion query. The second occlusion query is at least partially processed by the graphics system before a final result of any one of the first occlusion queries is computed by the graphics system.

In one embodiment, the graphics application program interface may prevent breaks in the processing of the graphics data in the components of the graphics system by processing a plurality of occlusion queries before returning a result of any one of the occlusion queries. By this design, graphic data separate from a plurality of occlusion queries may be processed while processing the occlusion queries. In other words, the time it takes for the occlusion query results to be returned may overlap with other useful work, such as rendering other parts of the scene or performing other computations on a central processing unit. More information regarding such parallel processing will be set forth during reference to the specific embodiment of FIG. 6.

With the occlusion queries complete, writes to the frame buffer are again enabled in operation 318, along with any other advanced features. Similar to the disabling, such enabling may be accomplished using any desired, predetermined command. Rendering of the objects then begins by choosing one of the objects in operation 320, and subsequently obtaining an occlusion query result associated with the chosen object. See operation 322.

It may then be determined whether the object is occluded based on the results in decision 324. If not visible, the object is rendered in operation 326. If, however, the object is occluded, as determined decision 324, no rendering of the object takes place.

Next, it is determined whether additional objects exist in operation 328. If so, operations 320–326 are repeated accordingly. In a similar manner, it is determined in decision 330 whether additional frames exist. If so, the method 300 may be repeated in the manner indicated.

The various techniques of the foregoing method 300 may be used in various applications, in the context of alternate embodiments. Just by way of example, such technique may be altered by conditionally rendering the object based on whether visibility information (i.e. a number of pixels, etc.) surpasses a predetermined threshold. See FIG. 4. Moreover, such technique may be used to render objects using various levels-of-detail (LOD). See FIG. 5. Still yet, various other processes may be conducted while the occlusion queries are being processed. See FIG. 6. Further, a technique may be provided for stopping the rendering of the bounding volume when a threshold is crossed. See FIG. 7. In yet another embodiment, the method 300 may be used to provide an effect (i.e. halo, lens flare, etc.) that is generated proportional to a visibility measure. See FIG. 8. Also, the method 300 may be used in a multiple rendering pass context. See FIGS. 9A–9B. Even still, the foregoing techniques may be enhanced by keeping track of which objects are visible using visible/hidden object lists. See FIGS. 10A–10B. As an option, the present technique may be utilized in the context of a depth-peeling application. See FIGS. 11–15. Of course, any combination of the foregoing alternate embodiments may be employed simultaneously per the desires of the user.

More information will now be set forth regarding each of the foregoing alternate embodiments.

Figure 4:
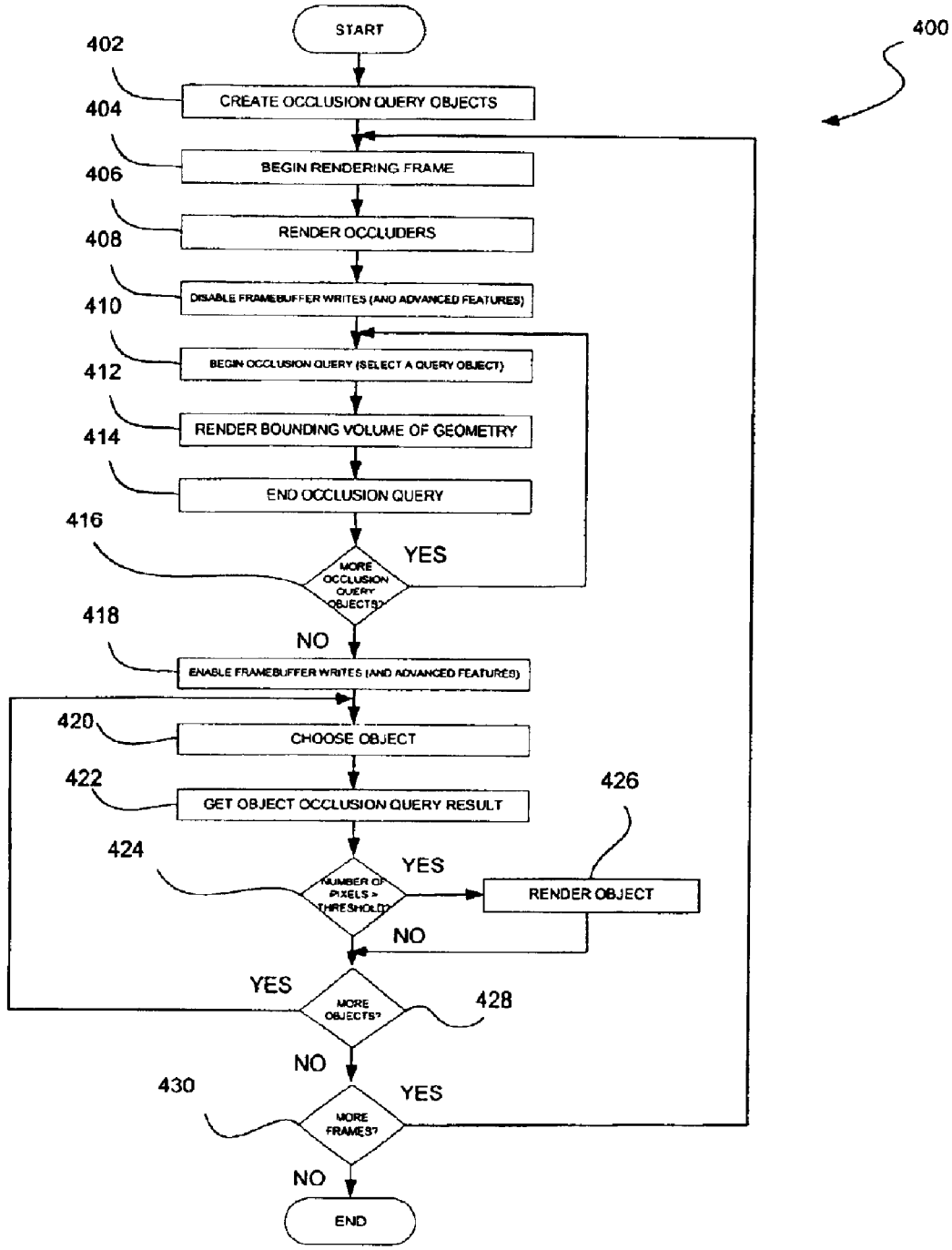
FIG. 4 illustrates another method for accelerating graphics processing utilizing a graphics application program interface in conjunction with a hardware graphics pipeline, where objects are conditionally rendered based on whether visibility information (i.e. a number of pixels, etc.) surpasses a predetermined threshold.

FIG. 4 illustrates another method 400 for accelerating graphics processing utilizing a graphics application program interface in conjunction with a hardware graphics pipeline, in accordance with another embodiment. As an option, the present method 400 may be implemented in the context of the foregoing architecture of FIGS. 1 and 2. Of course, the method 400 may be implemented in any desired context.

The present method 400 provides such acceleration by processing a plurality of occlusion queries before returning a result of any one of the occlusion queries. Further, objects are conditionally rendered based on whether visibility information (i.e. a number of pixels, etc.) surpasses a predetermined threshold.

Initially, a plurality of occlusion query objects is created. Note operation 402. Next, in operation 404, frame rendering is begun, during which a plurality of occluder objects of a frame are rendered in operation 406. Writes to a frame buffer are then disabled in operation 408. As shown, other advanced features may further be disabled in operation 408.

At this point, in operation 410, an occlusion query is begun by selecting an object. Next, the occlusion query is carried out by rendering a bounding volume of geometry in operation 412. It should be noted that the result of the occlusion query may include visibility information.

Such visibility information may include a number of visible pixels, a number of visible samples, a number of visible triangles, a number of visible polygons, a number of visible front-facing polygons, or any other information pertaining to the visibility of the objects. As will become apparent, the visibility information associated with an object may be compared with a predetermined threshold so that the object may be conditionally rendered based on the comparison. As an option, the visibility information may even be selected.

In operation 414, the occlusion query is ended, after which it is determined whether additional objects exist. Note decision 416. Based on the outcome of decision 416, operations 410-414 may be repeated for each of a plurality of objects.

With the occlusion queries complete, writes to the frame buffer are again enabled in operation 418, along with any other advanced features. Rendering of the objects then begins by choosing one of the objects in operation 420, and subsequently obtaining an occlusion query result associated with the chosen object. See operation 422.

It may then be determined whether the aforementioned visibility information meets a predetermined threshold. In one embodiment, it may be determined whether a number of pixels (i.e. a pixel count) is greater than a predetermined threshold. See decision 424. The currently selected object is then rendered in operation 426 if the threshold is surpassed.

Next, it is determined whether additional objects exist in decision 428. If so, operations 420-426 are repeated accordingly. In a similar manner, it is determined in decision 430 whether additional frames exist. If so, the method 400 may be repeated in the manner indicated.

Figure 5:
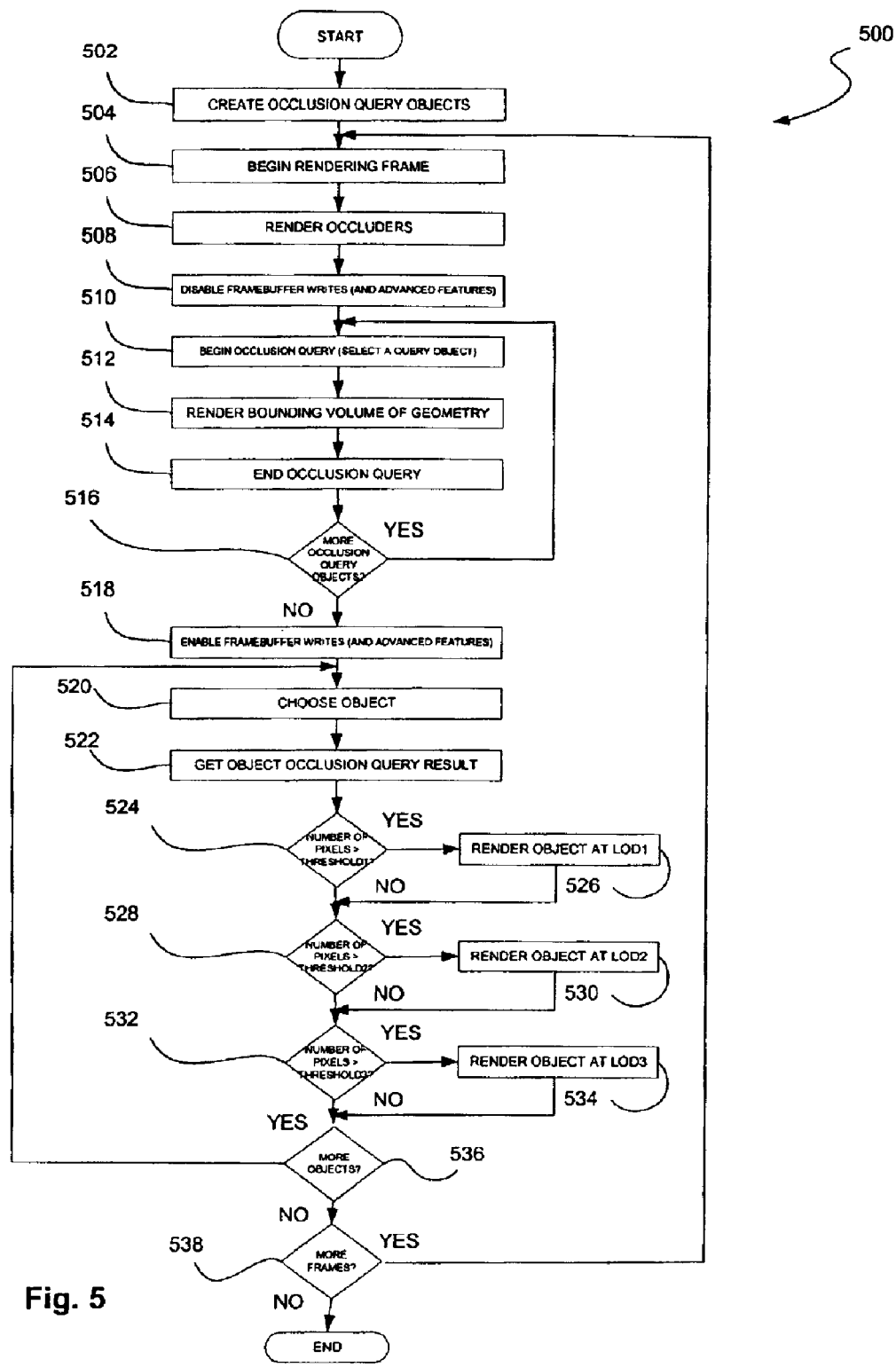
FIG. 5 illustrates another method for accelerating graphics processing utilizing a graphics application program interface in conjunction with a hardware graphics pipeline, where such technique may be used to render objects using various levels-of-detail (LOD).

FIG. 5 illustrates another method 500 for accelerating graphics processing utilizing a graphics application program interface in conjunction with a hardware graphics pipeline, in accordance with another embodiment. As an option, the present method 500 may be implemented in the context of the foregoing architecture of FIGS. 1 and 2. Of course, the method 500 may be implemented in any desired context.

Similar to the previous embodiments, the present method 500 provides such acceleration by processing a plurality of occlusion queries before returning a result of any one of the occlusion queries. Moreover, such technique may be used to render objects using various levels-of-detail (LOD).

Initially, a plurality of occlusion query objects are created. Note operation 502. Next, in operation 504, frame rendering is begun, during which a plurality of occluder objects of a frame are rendered in operation 506. Writes to a frame buffer are then disabled in operation 508. As shown, other advanced features may further be disabled in operation 508.

At this point, in operation 510, an occlusion query is begun by selecting an object. Next, the occlusion query is carried out by rendering a bounding volume of geometry in operation 512. It should be noted that the result of the occlusion query may include visibility information. Such visibility information may include a number of visible pixels, a number of visible samples, a number of visible triangles, a number of visible polygons, a number of visible front-facing polygons, or any other information pertaining to the visibility of the objects.

In operation 514, the occlusion query is ended, after which it is determined whether additional objects exist. Note decision 516. Based on the outcome of decision 516, operations 510–514 may be repeated for each of a plurality of objects.

With the occlusion queries complete, writes to the frame buffer are again enabled in operation 518, along with any other advanced features. Rendering of the objects then begins by choosing one of the objects in operation 520, and subsequently obtaining an occlusion query result associated with the chosen object. See operation 522.

It may then be determined whether the aforementioned visibility information meets various predetermined thresholds, and rendering may be commenced at different levels-of-detail based on such thresholds. Again, the visibility information may include a number of visible pixels, a number of visible samples, a number of visible triangles, a number of visible polygons, a number of visible front-facing polygons, or any other information pertaining to the visibility of the objects.

In one embodiment, it may be determined whether a number of pixels is greater than a first predetermined threshold. See decision 524. The currently selected object is then rendered at a first LOD in operation 526 if the first threshold is surpassed. It may then be determined whether a number of pixels is greater than a second predetermined threshold. See decision 528. The currently selected object is then rendered at a second LOD in operation 530 if the second threshold is surpassed. In a similar manner, it may then be determined whether a number of pixels is greater than a third predetermined threshold. See decision 532. The currently selected object is then rendered at a third LOD in operation 534 if the third threshold is surpassed.

Knowing the number of pixels visible in the bounding volume based on the occlusion queries may thus aid in deciding with which LOD an object should be drawn. If only a few pixels are visible, a low-LOD model may be acceptable. In general, this allows LOD mechanisms to be less ad hoc.

Next, it is determined whether additional objects exist in decision 536. If so, operations 520–534 are repeated accordingly. In a similar manner, it is determined in decision 538 whether additional frames exist. If so, the method 500 may be repeated in the manner indicated.

Figure 6:
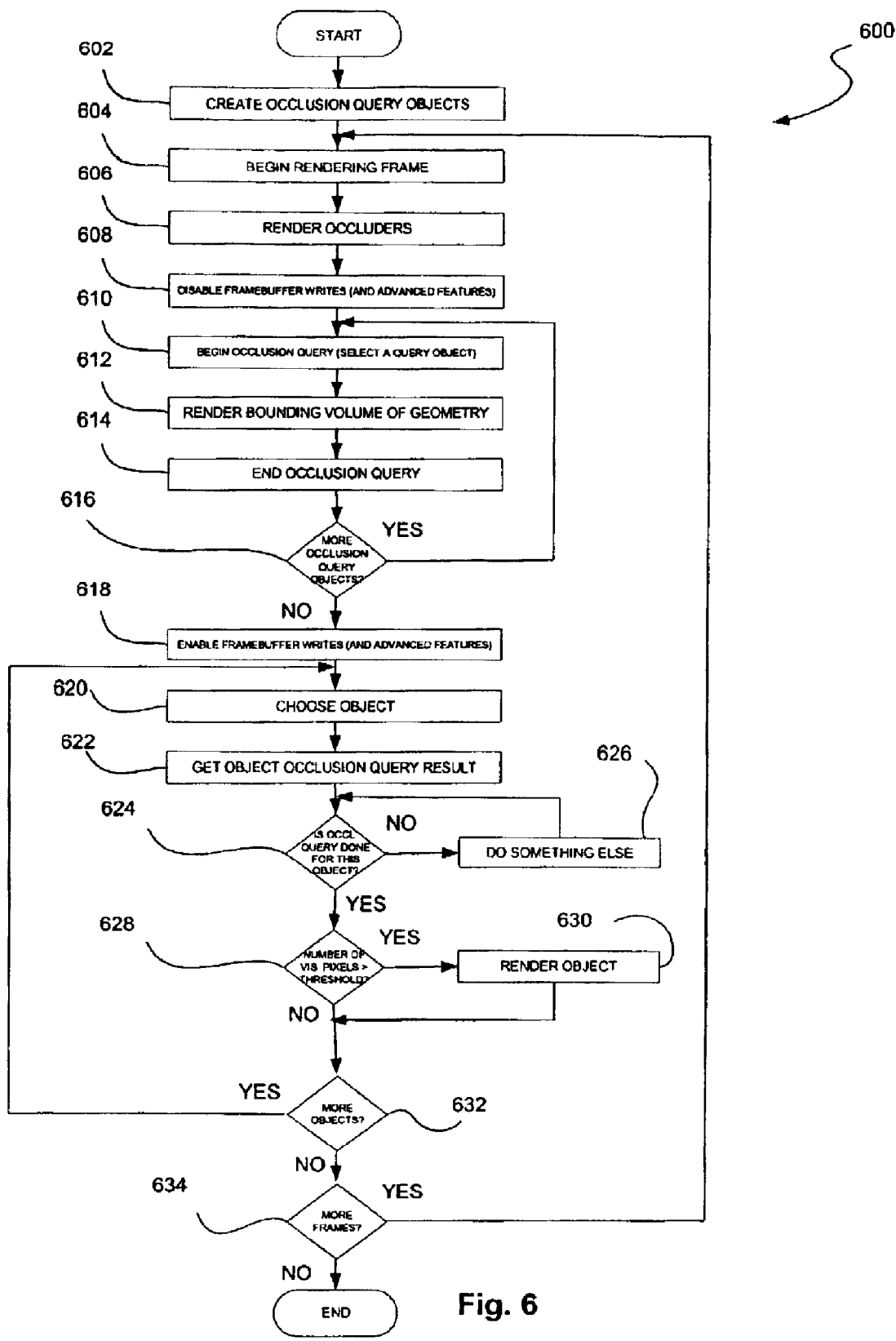
FIG. 6 illustrates another method for accelerating graphics processing utilizing a graphics application program interface in conjunction with a hardware graphics pipeline, where various other processes may be conducted while the occlusion queries are being processed.

FIG. 6 illustrates another method 600 for accelerating graphics processing utilizing a graphics application program interface in conjunction with a hardware graphics pipeline, in accordance with another embodiment. As an option, the present method 600 may be implemented in the context of the foregoing architecture of FIGS. 1 and 2. Of course, the method 600 may be implemented in any desired context.

The present method 600 provides such acceleration by processing a plurality of occlusion queries before returning a result of any one of the occlusion queries. As will soon become apparent, various other processes may be conducted while the occlusion queries are being processed.

Initially, a plurality of occlusion query objects are created. Note operation 602. Next, in operation 604, frame rendering is begun, during which a plurality of occluder objects of a frame are rendered in operation 606. Writes to a frame buffer are then disabled in operation 608. As shown, other advanced features may further be disabled in operation 608.

At this point, in operation 610, an occlusion query is begun by selecting an object. Next, the occlusion query is carried out by rendering a bounding volume of geometry in operation 612. In operation 614, the occlusion query is ended, after which it is determined whether additional objects exist. Note decision 616. Based on the outcome of decision 616, operations 610–614 may be repeated for each of a plurality of objects.

With the occlusion queries complete, writes to the frame buffer are again enabled in operation 618, along with any other advanced features. Rendering of the objects then begins by choosing one of the objects in operation 620, and subsequently obtaining an occlusion query result associated with the chosen object. See operation 622.

During use, it may be determined whether the occlusion query associated with the current object is completed and an associated result is available. See decision 624. If not, some other process may be conducted in operation 626. For example, the other parts of a scene may be rendered or other computations may be performed on a central processing unit. This contributes to the performance of graphics processing while preventing the aforementioned breaks or pauses.

By this design, graphic data separate from a plurality of occlusion queries may be processed while processing the occlusion queries. In other words, the time it takes for the occlusion query results to be returned may overlap with other useful work, such as rendering other parts of the scene or performing other computations on a central processing unit.

It may then be determined whether the object is occluded based on the results in decision 628. This may be accomplished utilizing the various aforementioned threshold-based tests involving visibility information, or any other desired technique. If the object is not occluded, the object is rendered in operation 630. If, however, the object is occluded, as determined decision 628, no rendering of the object takes place.

Next, it is determined whether additional objects exist in operation 632. If so, operations 620–630 are repeated accordingly. In a similar manner, it is determined in decision 634 whether additional frames exist. If so, the method 600 may be repeated in the manner indicated.

Figure 7:
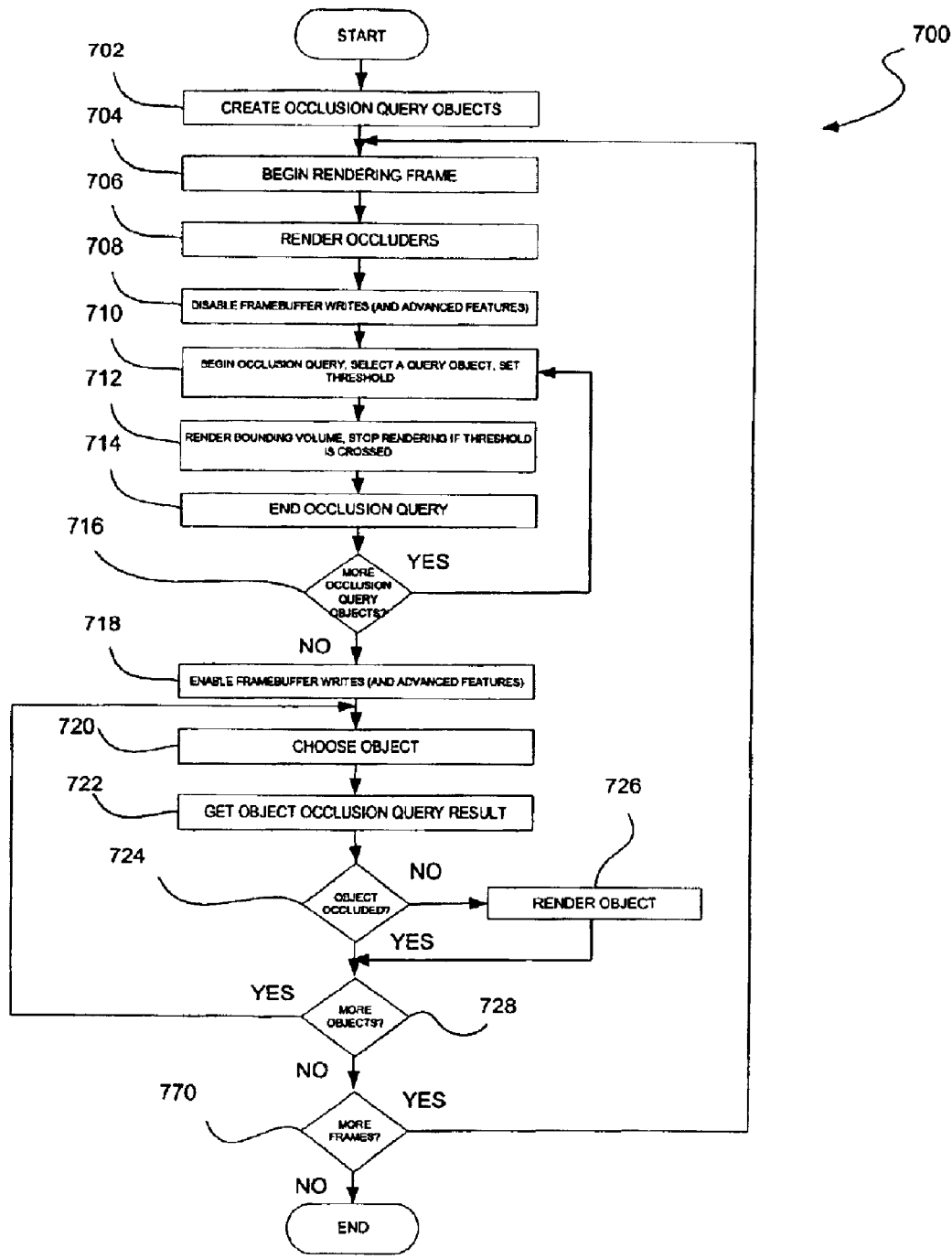
FIG. 7 illustrates another method for accelerating graphics processing utilizing a graphics application program interface in conjunction with a hardware graphics pipeline, where rendering of a bounding volume is terminated during an occlusion query when a threshold is crossed.

FIG. 7 illustrates another method 700 for accelerating graphics processing utilizing a graphics application program interface in conjunction with a hardware graphics pipeline, in accordance with another embodiment. As an option, the present method 700 may be implemented in the context of the foregoing architecture of FIGS. 1 and 2. Of course, the method 700 may be implemented in any desired context.

The present method 700 provides such acceleration by processing a plurality of occlusion queries before returning a result of any one of the occlusion queries. As will soon become apparent, a technique may also be provided therewith for stopping the rendering of the bounding volume during an occlusion query when a threshold is crossed.

Initially, a plurality of occlusion query objects are created. Note operation 702. Next, in operation 704, frame rendering is begun, during which a plurality of occluder objects of a frame are rendered in operation 706. Writes to a frame buffer are then disabled in operation 708. As shown, other advanced features may further be disabled in operation 708.

At this point, in operation 710, an occlusion query is begun by selecting an object and setting a threshold. Next, the occlusion query is carried out by rendering a bounding volume of geometry in operation 712. During such operation, rendering of the bounding volume may be ceased at any time that the threshold is surpassed. To this end, the resources required to render the bounding volume may be saved if the test involving the threshold indicates that it is not necessary.

In operation 714, the occlusion query is ended, after which it is determined whether additional objects exist. Note decision 716. Based on the outcome of decision 716, operations 710–714 may be repeated for each of a plurality of objects.

With the occlusion queries complete, writes to the frame buffer are again enabled in operation 718, along with any other advanced features. Rendering of the objects then begins by choosing one of the objects in operation 720, and subsequently obtaining an occlusion query result associated with the chosen object. See operation 722.

It may then be determined whether the object is occluded based on the results in decision 724. If not, the object is rendered in operation 726. If, however, the object is occluded, as determined decision 724, no rendering of the object takes place.

Next, it is determined whether additional objects exist in operation 728. If so, operations 720–726 are repeated accordingly. In a similar manner, it is determined in decision 770 whether additional frames exist. If so, the method 700 may be repeated in the manner indicated.

Figure 8:
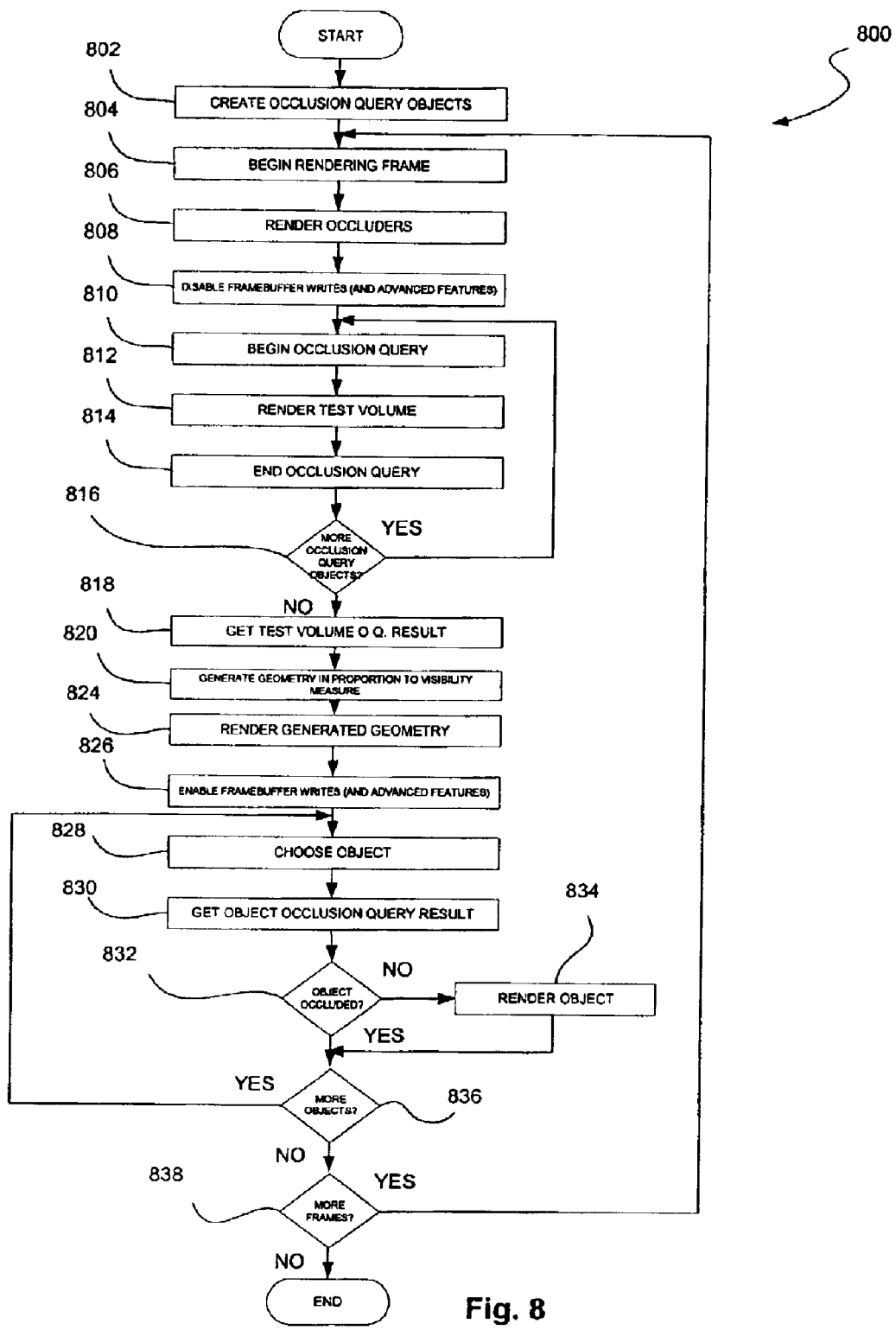
FIG. 8 illustrates another method for accelerating graphics processing utilizing a graphics application program interface in conjunction with a hardware graphics pipeline, where an effect (i.e. halo, lens flare, etc.) is generated proportional to a visibility measure.

FIG. 8 illustrates another method 800 for accelerating graphics processing utilizing a graphics application program interface in conjunction with a hardware graphics pipeline, in accordance with another embodiment. As an option, the present method 800 may be implemented in the context of the foregoing architecture of FIGS. 1 and 2. Of course, the method 800 may be implemented in any desired context.

The present method 800 provides such acceleration by processing a plurality of occlusion queries before returning a result of any one of the occlusion queries. As will soon become apparent, the present method 800 may be used to provide an effect (i.e. halo, lens flare, etc.) that is generated proportional to a visibility measure.

Initially, a plurality of occlusion query objects are created. Note operation 802. Next, in operation 804, frame rendering is begun, during which a plurality of occluder objects of a frame are rendered in operation 806. Writes to a frame buffer are then disabled in operation 808. As shown, other advanced features may further be disabled in operation 808.

At this point, in operation 810, an occlusion query is begun by selecting an object. Next, the occlusion query is carried out by rendering a test bounding volume of geometry in operation 812. It should be noted that the result of the occlusion query may include visibility information. Such visibility information may include a number of visible pixels, a number of visible samples, a number of visible triangles, a number of visible polygons, a number of visible front-facing polygons, or any other information pertaining to the visibility of the objects.

In operation 814, the occlusion query is ended, after which it is determined whether additional objects exist. Note decision 816. Based on the outcome of decision 816, operations 810–814 may be repeated for each of a plurality of objects.

With the occlusion queries complete, the results of an occlusion query is obtained in operation 818. Geometry is then generated in proportion to a visibility measure, which may be indicated by the visibility information. See operation 820. The generated geometry may then be rendered in operation 824.

Thus, occlusion queries can be used as a replacement for "glReadPixels" of a depth buffer or other similar mechanisms to determine whether a light source is visible for the purposes of a lens flare effect, a halo, or any other graphics effect. Pixel counts may allow the computation of the percentage of the light source that is visible. To this end, the brightness of the foregoing effects may be modulated accordingly.

Writes to the frame buffer are then again enabled in operation 826, along with any other advanced features. Rendering of the objects then begins by choosing one of the objects in operation 828, and subsequently obtaining an occlusion query result associated with the chosen object. See operation 830.

It may then be determined whether the object is occluded based on the results in decision 832. If not, the object is rendered in operation 834. If, however, the object is occluded, as determined decision 832, no rendering of the object takes place.

Next, it is determined whether additional objects exist in operation 836. If so, operations 828–834 are repeated accordingly. In a similar manner, it is determined in decision 838 whether additional frames exist. If so, the method 800 may be repeated in the manner indicated.

Figure 9A:
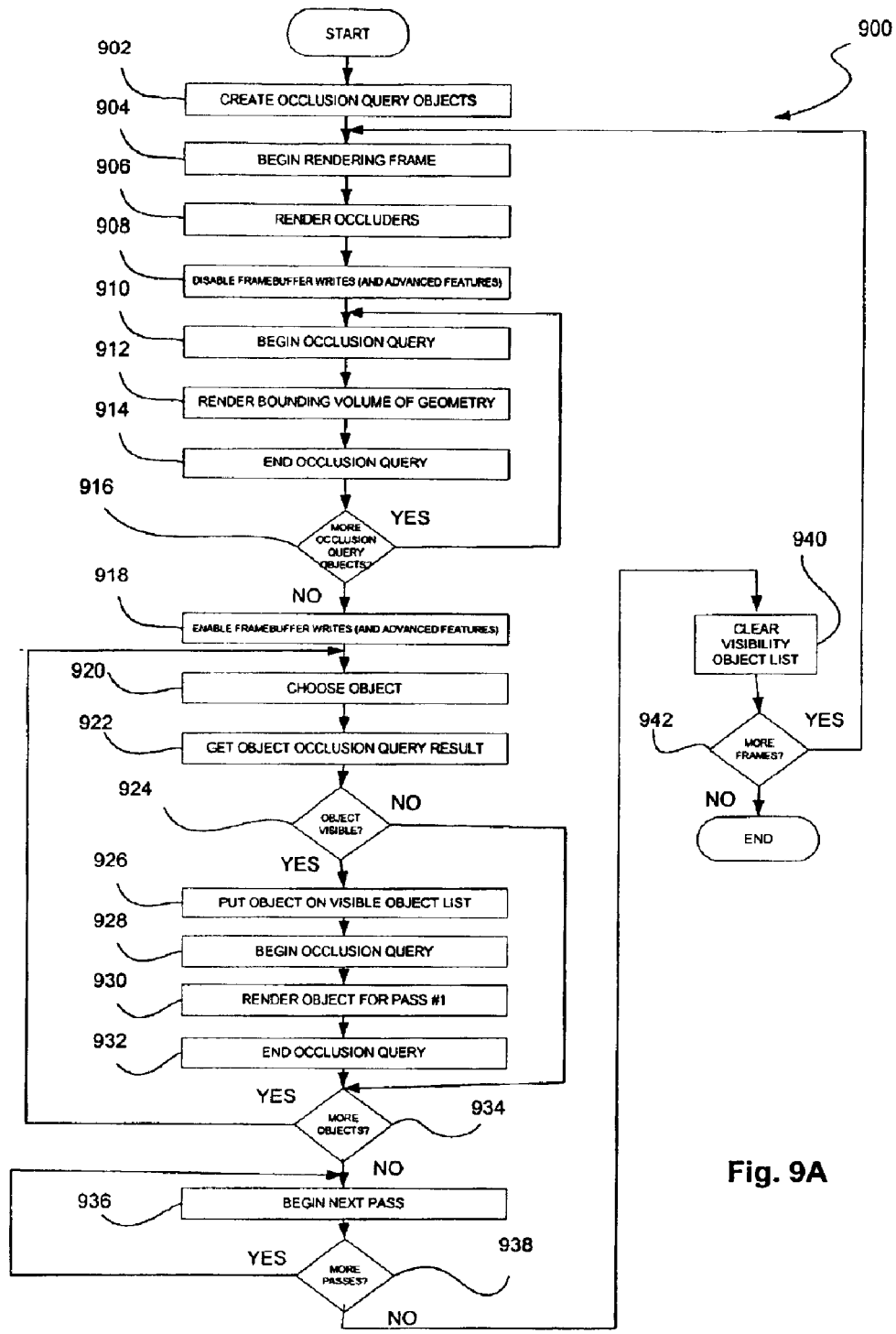
FIG. 9A illustrates another method for accelerating graphics processing utilizing a graphics application program interface in conjunction with a hardware graphics pipeline, where the method may be used in the context of a multiple rendering pass system.

FIG. 9A illustrates another method 900 for accelerating graphics processing utilizing a graphics application program interface in conjunction with a hardware graphics pipeline, in accordance with another embodiment. As an option, the present method 900 may be implemented in the context of the foregoing architecture of FIGS. 1 and 2. Of course, the method 900 may be implemented in any desired context.

The present method 900 provides such acceleration by processing a plurality of occlusion queries before returning a result of any one of the occlusion queries. Further, the method 900 may be used in the context of a multiple rendering pass system.

Initially, a plurality of occlusion query objects are created. Note operation 902. Next, in operation 904, frame rendering is begun, during which a plurality of occluder objects of a frame are rendered in operation 906. Writes to a frame buffer are then disabled in operation 908. As shown, other advanced features may further be disabled in operation 908.

At this point, in operation 910, an occlusion query is begun by selecting an object. Next, the occlusion query is carried out by rendering a bounding volume of geometry in operation 912. In operation 914, the occlusion query is ended, after which it is determined whether additional objects exist. Note decision 916. Based on the outcome of decision 916, operations 910–914 may be repeated for each of a plurality of objects.

With the occlusion queries complete, writes to the frame buffer are again enabled in operation 918, along with any other advanced features. Rendering of the objects then begins by choosing one of the objects in operation 920, and subsequently obtaining an occlusion query result associated with the chosen object. See operation 922.

It may then be determined whether the current object is visible. See decision 924. The currently selected object is then tracked on a visible object list in operation 926 if it is determined that the object is visible. Rendering then begins during a first pass.

Similar to before, in operation 928, an occlusion query is begun by selecting an object. Next, the selected object is rendered during a first pass in operation 930. In operation 932, the occlusion query is ended, after which it is determined whether additional objects exist. Note decision 34. Based on the outcome of decision 936, operations 920–932 may be repeated for each of a plurality of objects during the first pass.

Once all of the objects have been rendered during the first pass, an additional pass is begun in operation 936. Thereafter, it is determined whether additional passes are required. See decision 938. If so, operation 936 is repeated. If not, however, the visibility object list may be cleared in operation 940. More information regarding each of such additional passes of operation 936 will be set forth hereinafter in greater detail during reference to FIG. 9B.

When objects are rendered with multiple rendering passes in the foregoing manner, the first pass of operation 930 can be wrapped with an occlusion query for little resource expenditure. That is, objects in the scene may be rendered during a first pass, during which visibility information (i.e. the number of pixels rendered on each object) may be collected. If zero pixels were rendered for an object, subsequent rendering passes of operation 936 may be skipped.

Finally, it is determined in decision 942 whether additional frames exist. If so, the method 900 may be repeated in the manner indicated.

Figure 9B:
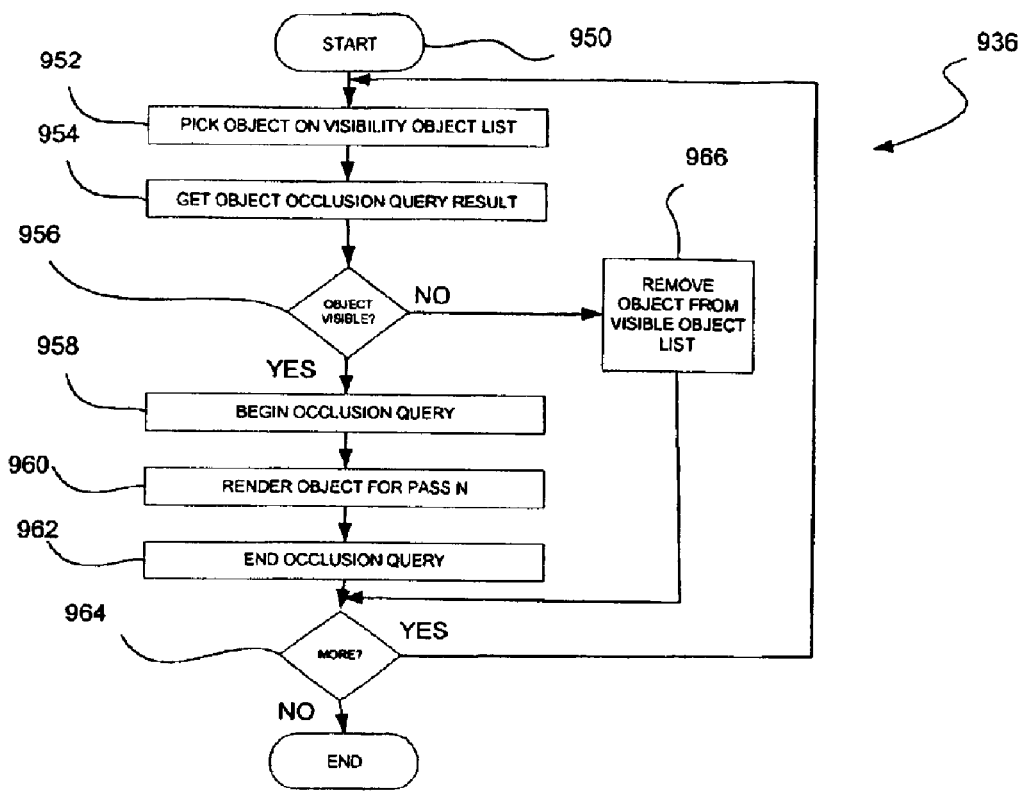
FIG. 9B illustrates a method for initiating another rendering pass, in accordance with operation 936 of FIG. 9A.

FIG. 9B illustrates a method 950 for initiating a rendering pass, in accordance with operation 936 of FIG. 9A. As shown, in operation 952, an object is selected, after which an occlusion query result associated with the selected object is obtained. Note operation 954.

It may then be determined whether the current object is visible. See decision 956. If not, the currently selected object is then removed from the visible object list in operation 966. If, however, it is determined that the current object is visible, an occlusion query is begun in operation 958. The object is then rendered in the additional pass. See operation 960. In operation 962, the occlusion query is ended, after which it is determined whether additional objects exist. Note decision 964. Based on the outcome of decision 964, operations 952–962 may be repeated for each of a plurality of objects during the present pass.

Figure 10A:
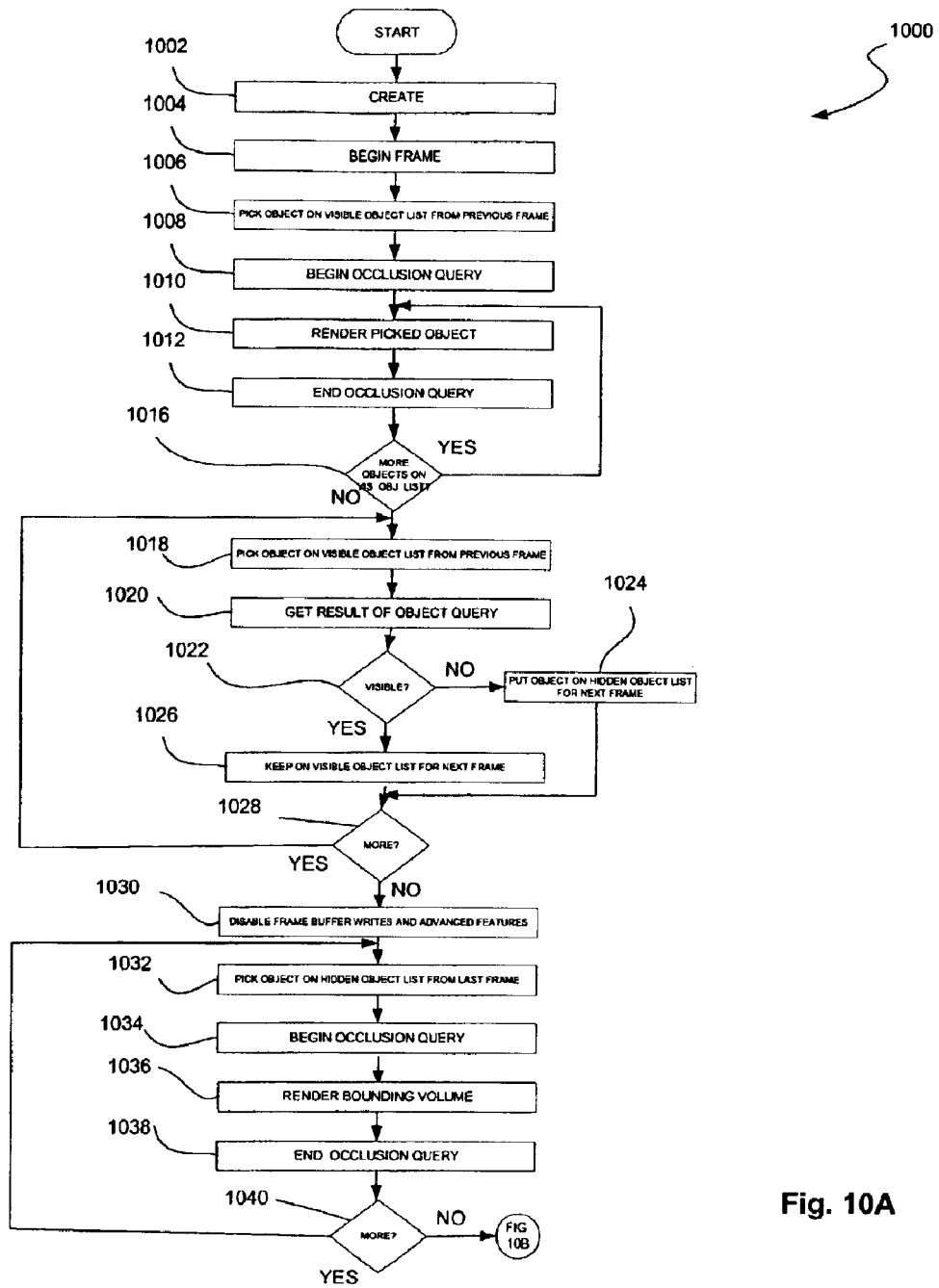
FIGS. 10A and 10B illustrate another method for accelerating graphics processing utilizing a graphics application program interface in conjunction with a hardware graphics pipeline, where the method is enhanced by keeping track of which objects are visible using visible/hidden object lists.

FIG. 10A illustrates another method 1000 for accelerating graphics processing utilizing a graphics application program interface in conjunction with a hardware graphics pipeline, in accordance with another embodiment. As an option, the present method 1000 may be implemented in the context of the foregoing architecture of FIGS. 1 and 2. Of course, the method 1000 may be implemented in any desired context.

The present method 1000 provides such acceleration by processing a plurality of occlusion queries before returning a result of any one of the occlusion queries. Further, the present technique is enhanced by keeping track of which objects are visible using visible/hidden object lists. In other words, objects which are determined to be visible in a particular frame are included in a visible object list associated with the particular frame. Similarly, objects which are determined to be invisible in a particular frame are included in a hidden object list associated with the particular frame.

Initially, a plurality of occlusion query objects are created. Note operation 1002. Next, in operation 1004, frame rendering is begun, after which an object is selected from a visible object list associated with a previous frame. Note operation 1006. Next, in operation 1008, an occlusion query is begun. Next, the occlusion query is carried out by rendering the selected object, as indicated in operation 1010. In operation 1012, the occlusion query is ended, after which it is determined whether additional objects exist in the present visible object list. Note decision 1016. Based on the outcome of decision 1016, operations 1010–1012 may be repeated for each of a plurality of objects associated with the visible object list.

Rendering of the objects then begins by again choosing one of the objects from the visible object list associated with the previous frame. Note operation 1018. An occlusion query result associated with the chosen object is then obtained. See operation 1020. It may be determined in decision 1022 whether the current object is visible based on the result obtained in operation 1020. If not, the object is put on a hidden object list associated with the next frame. Note operation 1024. If, however, it is determined in decision 1022 that the current object is visible, the object is maintained on the visible object list for the next frame. See operation 1026.

Next, it is determined whether additional objects exist in decision 1028. If so, operations 1018–1026 are repeated accordingly.

Writes to a frame buffer are then disabled in operation 1030. As shown, other advanced features may further be disabled in operation 1030. At this point, in operation 1032, an object on the hidden object list from the last frame is selected. An occlusion query is subsequently begun in operation 1034. Next, the occlusion query is carried out by rendering a bounding volume of geometry in operation 1036. In operation 1038, the occlusion query is ended, after which it is determined whether additional objects exist. Note decision 1040. Based on the outcome of decision 1040, operations 1032–1038 may be repeated for each of a plurality of objects.

Figure 10B:
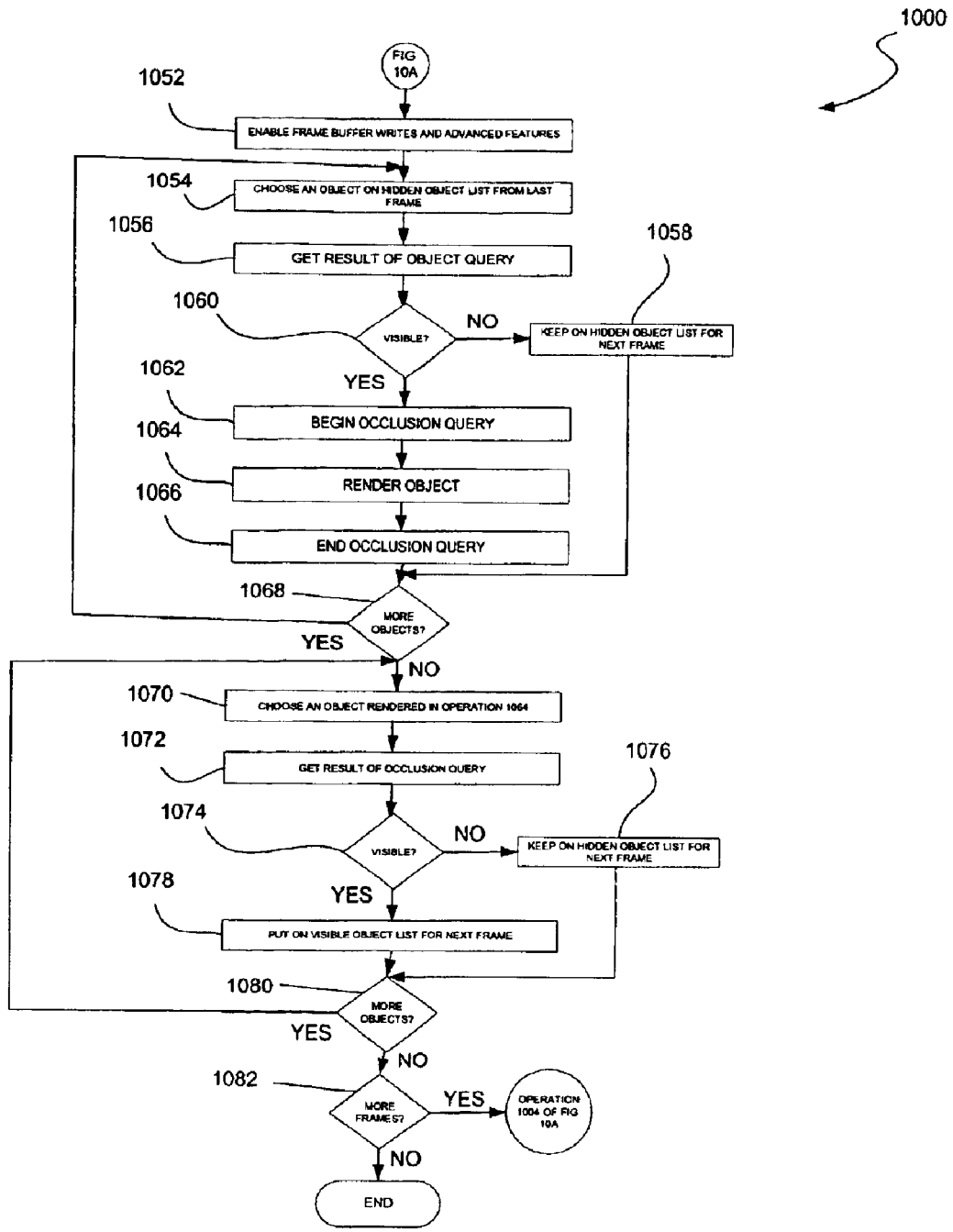

With reference now to FIG. 10B, a continuation of the method 1000 of FIG. 10A is shown. With the occlusion queries complete, writes to the frame buffer are again enabled in operation 1052, along with any other advanced features. Rendering of the objects then begins by choosing one of the objects on the hidden object list from the last frame in operation 1054, and subsequently obtaining an occlusion query result associated with the chosen object. See operation 1056.

It may then be determined whether the current object is visible. See decision 1060. If not, the object is maintained on the hidden object list for the next frame in operation 1058. If not, however, an occlusion query is begun in operation 1062 and the currently selected object is then rendered in operation 1064 if visible. The occlusion query is then ended in operation 1066. Next, it is determined whether additional objects exist in decision 1068. If so, operations 1054–1066 are repeated accordingly.

Next, in operation 1070, an object rendered in operation 1064 is selected. An occlusion query result associated with such object is then obtained in operation 1072. It is then determined whether the object is visible based on the result in decision 1074. If not, the object is maintained on the hidden object list for the next frame. See operation 1076. If so, however, the object is put on the visible object list for the next frame in operation 1078.

Next, it is determined whether additional objects exist in decision 1080. If so, operations 1070–1078 are repeated accordingly. In a similar manner, it is determined in decision 1082 whether additional frames exist. If so, the method 1000 may be repeated in the manner indicated.

Thus, a visible object list may be maintained which indicates which of a plurality of objects are visible during the processing utilizing graphics application program interface. In use, objects may be added to the visible object list based on visibility information tracked utilizing the graphics application program interface. Further, objects may be removed from the visible object list based on visibility information tracked utilizing the graphics application program interface. As such, the objects may be rendered during multiple rendering passes utilizing the visible object list.

Figure 11:
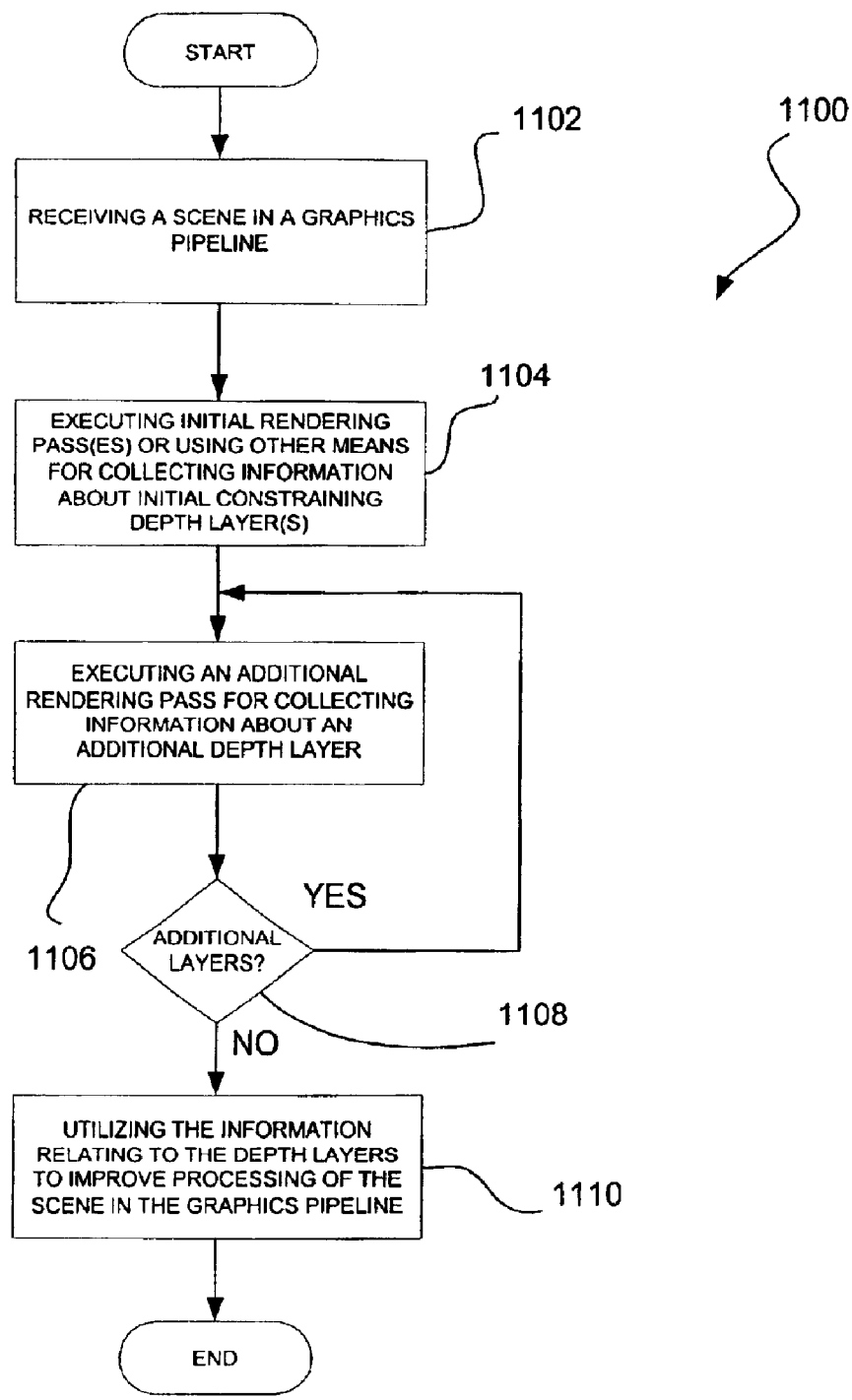
FIGS. 11–15 illustrate another method for accelerating graphics processing utilizing a graphics application program interface in conjunction with a hardware graphics pipeline, in accordance with a "depth peeling" embodiment.

FIG. 11 illustrates another method 1100 for accelerating graphics processing utilizing a graphics application program interface in conjunction with a hardware graphics pipeline, in accordance with a "depth peeling" embodiment. As an option, the present method 1100 may be implemented in the context of the foregoing architecture of FIGS. 1 and 2. Of course, the method 1100 may be implemented in any desired context.

"Depth peeling" techniques, such as order-independent transparency, typically require knowledge of when to stop rendering more layers. It is difficult, however, to come up with a way to determine a priori how many layers to use. It often makes sense to stop rendering when the number of pixels goes below a threshold.

As mentioned earlier, various visibility information may be tracked including a number of visible pixels, a number of visible samples, a number of visible triangles, a number of visible polygons, a number of visible front-facing polygons, or any other information-pertaining to the visibility of the objects. Thus, the visibility information associated with an object may be compared with a predetermined threshold in the context of depth peeling. Following is a description of a "depth peeling" technique with which the present technique may be employed.

Initially, in operation 1102, a scene is received in the graphics pipeline. In the context of the present description, a scene may refer to any particular set of objects, polygons, primitives, etc. that are to be rendered.

Next, in operation 1104, initial rendering passes may be executed or user-created buffer received for collecting information about initial depth layers. It should be noted that the initial depth layers may be collected in any desired manner. In use, the initial depth layers may be used as constraining depth layers which inherently define a plurality of depth constraints. The manner in which such initial depth layers operate as constraining depth layers will be set forth hereinafter in greater detail.

In the context of the present description, each rendering pass refers to any separate set of rendering processes carried out by the graphics pipeline. More information regarding the initial rendering passes in operation 1104 will be set forth in greater detail during reference to FIG. 12. In addition to or as an alternative for the initial rendering passes, one or more depth layers, in the form of shadow maps, may be directly received in the graphics pipeline.

The information that is collected in operation 1104 may include depth values (i.e. z-values), transparency information, color information, or absolutely any other type of data, parameters, or attributes that may be used to improve the realism resulting from the rendering process. Moreover, similar to each of the depth layers set forth in the present description, the constraining depth layers may include a portion of the scene (i.e. pixels corresponding to objects, polygons, primitives, etc.) that resides at predetermined depth levels in the scene. In the context of the present description, the term "depth" may refer to a distance or vector length between an eye/camera location and the corresponding fragment coordinates in a scene.

Thereafter, in operation 1106, at least one additional rendering pass is executed for collecting information about additional depth layers. As indicated by decision 1108, the operation 1106 is repeated for each additional depth layer desired. For reasons that will soon become apparent, the results of the rendering passes of operations 1104 and 1106 may be stored in memory such as a texture member associated with the graphics pipeline.

It should be noted that a plurality of depth tests may be performed on the results from each additional rendering pass as well as on other depth layers. Utilizing such multiple depth tests and multiple depth layers, information may be collected from a desired depth layer. More information regarding the at least one additional rendering pass and the associated multiple depth tests in operation 1106 will be set forth in greater detail during reference to FIG. 14.

Once it is determined in decision 1108 that no additional depth layers are desired, the information relating to each of the depth layers may be utilized to improve processing of the scene in the graphics pipeline. See operation 1110. In particular, the information may be used to improve the realism resulting from the rendering process in the graphics pipeline.

Figure 12:
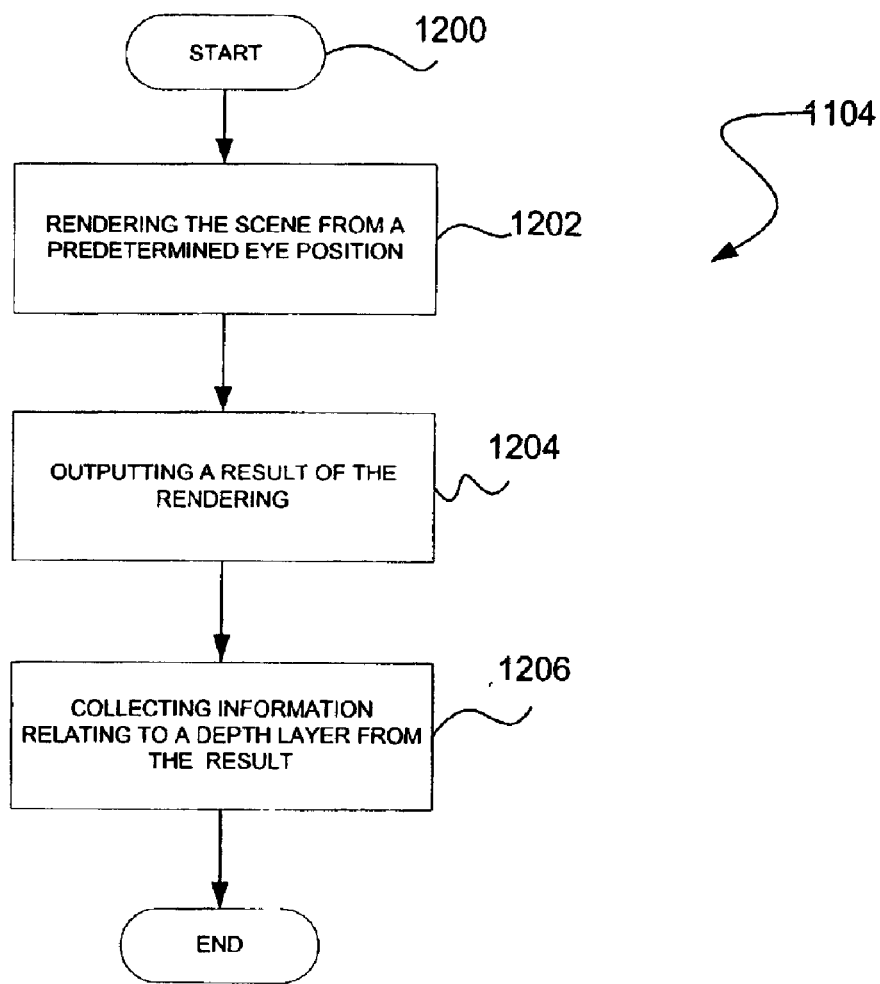

FIG. 12 illustrates a method 1200 associated with the initial rendering passes, in accordance with operation 1104 of FIG. 11. As shown, the scene is initially rendered from a predetermined eye position in a manner that is well known in the art. See operation 1202.

A result of the operation 1202 is then outputted in operation 1204. It should be noted that the result of operation 1202 may take any form that includes at least a portion of a rendered scene from which the information (i.e. data, parameters, attributes, etc.) relating to the constraining depth layers may be collected. Note operation 1206.

Figure 13:
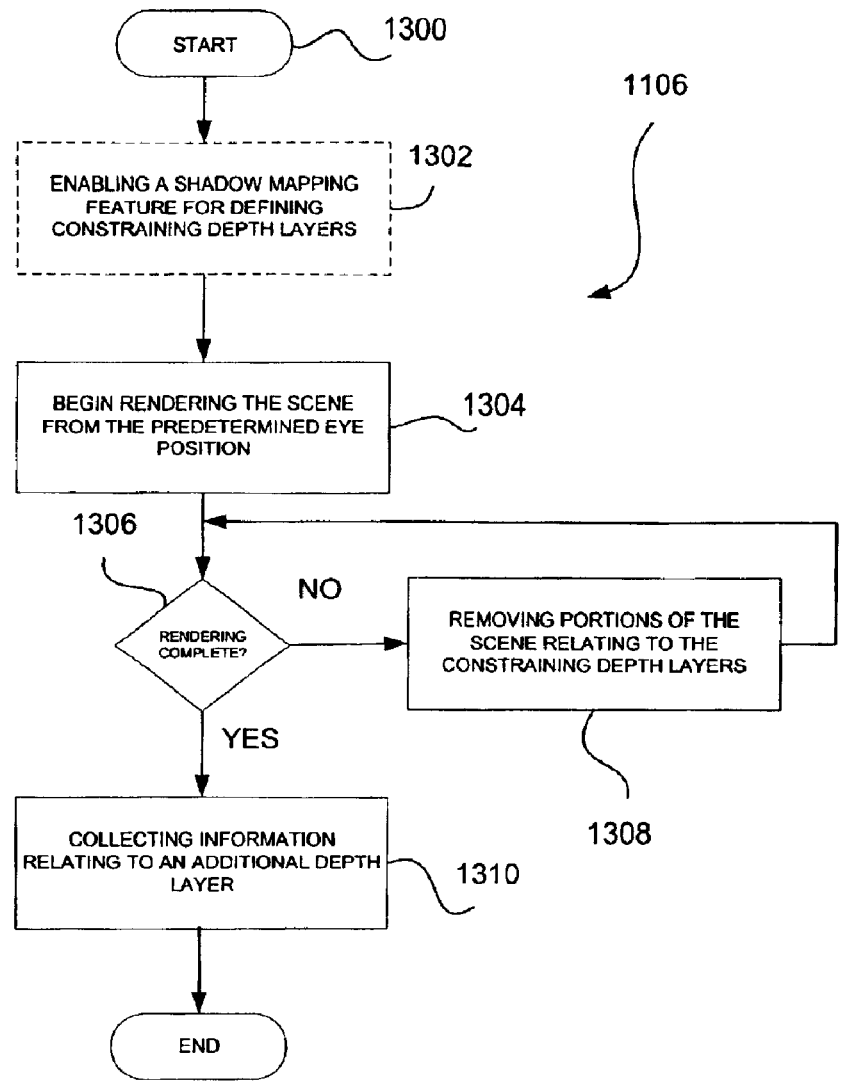

FIG. 13 illustrates a method 1300 for executing the at least one additional rendering pass, in accordance with operation 1106 of FIG. 11. Initially, in operation 1304, the scene is rendered. For reasons that will soon become apparent, it is important that the scene be rendered from the predetermined eye position associated with the first rendering pass of operation 1104 of FIG. 11.

In the context of an embodiment where shadow-mapping and alpha-test hardware is optionally utilized, an additional optional operation may take place. In particular, a shadow-mapping feature may be enabled during the at least one additional rendering pass in operation 1302. The shadow-mapping feature serves for defining the previous depth layers. In the first instance of operation 1304 of FIG. 13, the previous depth layers would be defined as the constraining depth layers, and so forth. By utilizing the shadow-mapping and alpha-test hardware in such a manner, another shadow map is outputted, which may be utilized as or added to the constraining depth layers during subsequent rendering passes.

In an embodiment where the shadow-mapping and alpha-test hardware is not utilized, the constraining depth layers may simply be stored during the previous rendering pass in any desired manner.

The pendency of operation 1304 is monitored in decision 1306. While the at least one additional rendering pass is taking place, portions of the scene relating to the constraining depth layers may be removed in operation 1308. In one embodiment, a particular set of tests may be employed to facilitate such removal. It should be noted that such tests may involve as many depth layers/constraints as necessary during each rendering pass in order to collect the desired information. More information on this test will be set forth in greater detail during reference to FIG. 14.

The purpose of operation 1308 is to remove any objects, polygons, primitives, etc. or portions (in the form of fragments) thereof related to any constraining depth layers that may be obstructing the at least one additional depth layer that is currently being rendered. By removing such portions of the scene, a result of the rendering pass may be effectively used to extract the information relating to the desired depth layer. Such removal process may be referred to as "depth peeling" or "Z-peeling" due to the manner in which it "peels" each of the portions of the scene relating to the constraining depth layer(s).

Once it is determined that the at least one additional rendering pass is complete in decision 1306, the information is collected from the results. See operation 1310. Of course, such method 1300 may be repeated as many times is needed to collect information from any desired number of depth layers.

Figure 14:
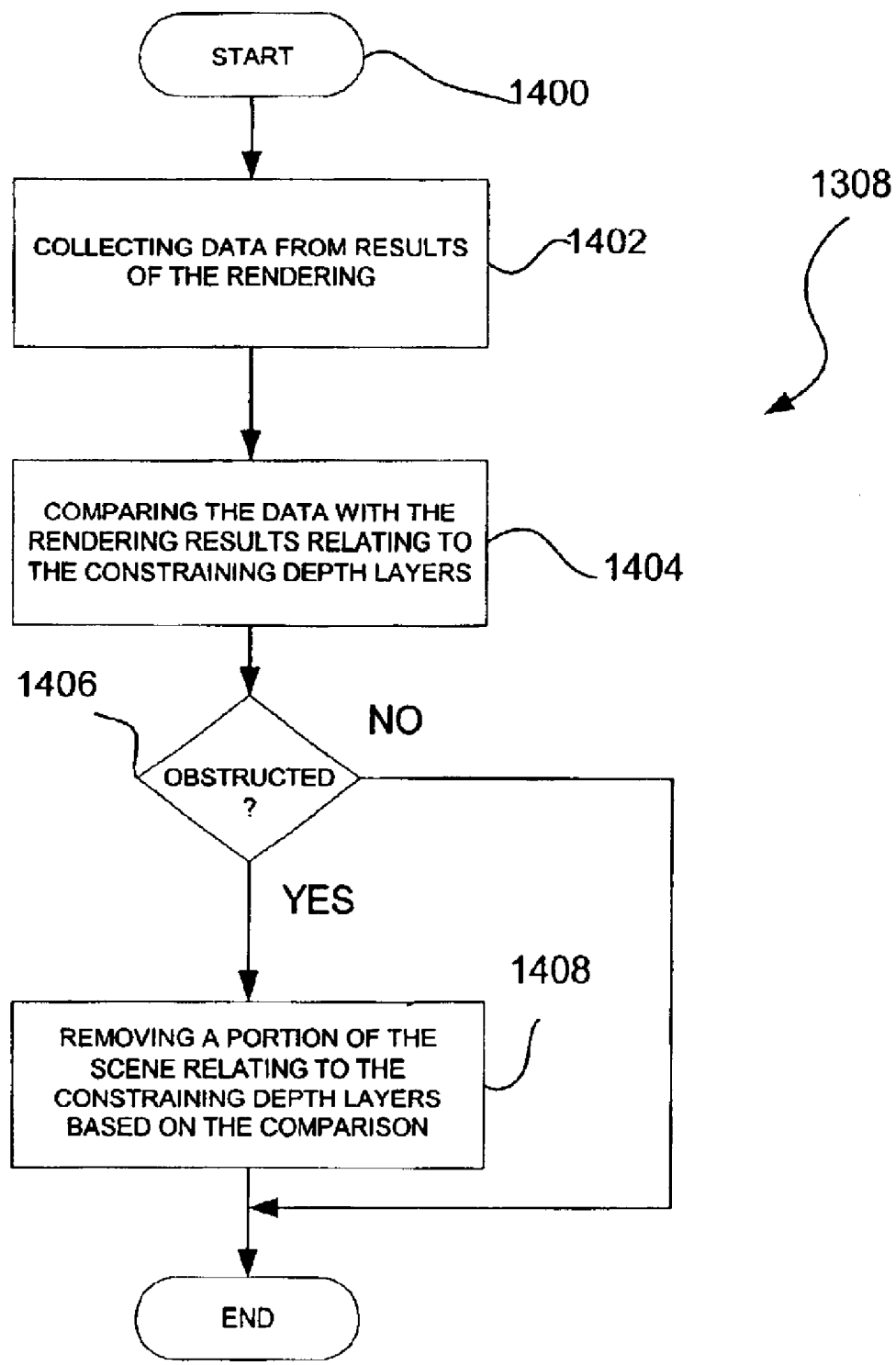

FIG. 14 illustrates a method 1400 of conducting a test for use during removal of portions of a scene during "depth peeling", in accordance with operation 1308 of FIG. 13. While the at least one additional rendering pass is occurring, preliminary data from results of the rendering are collected in operation 1402. Such data are compared with the rendering results associated with the constraining depth layers. See operations 1404 and 1406. More information on the particular values associated with the data of operation 1402 and the rendering results of operation 1404 will be set forth during reference to FIG. 15.

In the embodiment where shadow-mapping hardware is optionally utilized, it should be noted that the rendering results take the form of shadow maps associated with the constraining depth layers. As will soon become apparent, a portion of the scene relating to the previous depth layer is removed based on the comparison in operation 1408.

Figure 15:
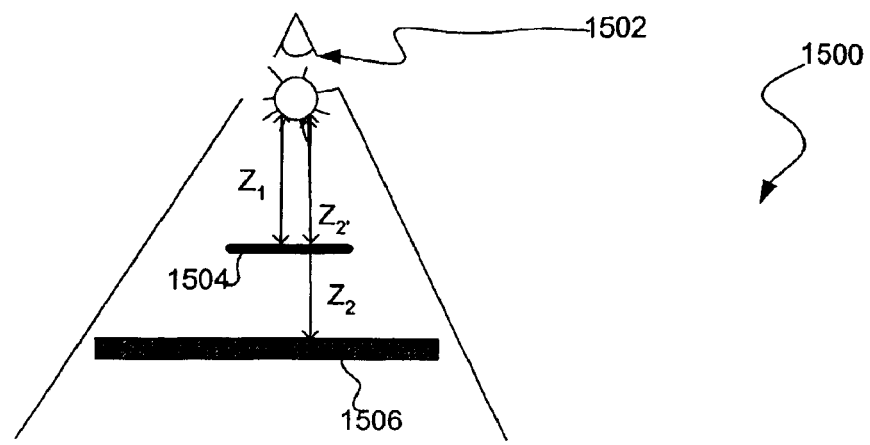
Figure 15:
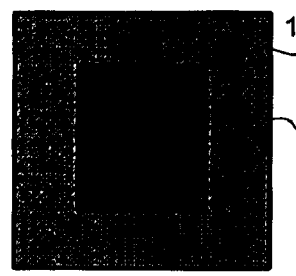
Figure 15:
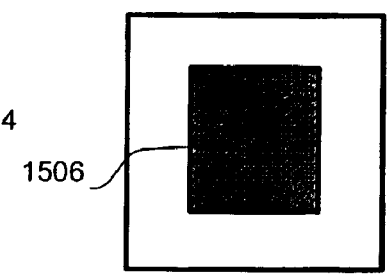

FIG. 15 illustrates the various parameters involved during the test of FIG. 14. As shown, a scene 1500 is being rendered during the at least one additional pass from the predetermined eye position associated with the previous rendering pass. Note eye position 1502. It should be noted that the example of FIG. 15 does not take into account the possibility of the existence of multiple previous layers for simplicity purposes.

In accordance with operation 1402 of FIG. 14, a constraining z-value ($Z_1$) relating to a portion 1504 of the scene 1500 associated with the constraining depth layer is collected. Further, in accordance with operation 1404 of FIG. 14, a second z-value ($Z_2$) relating to a portion 1506 of the scene 1500 associated with the at least one additional depth layer is collected. The "peeling" process most prevalently happens at the fragment level, so the portions 1504 and 1506 are generally partial polygons.

It should be noted that the second z-value ($Z_2$) may be greater than or equal to first z-value ($Z_1$) depending on whether a portion 1504 of the scene 1500 associated with the previous depth layer is in front of the portion 1506 of the scene 1500 associated with the at least one additional depth layer. Note the second z-value ($Z_2$) and the second z-value prime ($Z_2'$), respectively.

In other words, during operation 1404 of FIG. 14, difference values are calculated between constraining z-values ($Z_1$) relating to the constraining depth layers and z-values ($Z_2$) relating to the at least one additional depth layer. Upon no difference being calculated between the constraining z-values ($Z_1$) relating to the constraining depth layers and the z-values ($Z_2$) relating to the at least one additional depth layer (when the second z-value is $Z_2'$), it may be assumed that the portion 1504 of the scene 1500 associated with the constraining depth layers obstruct the portion 1506 of the scene 1500 associated with the at least one additional depth layer. See decision 1406 of FIG. 14. In such case, the portion 1504 of the scene 1500 associated with the constraining depth layers is removed before the results of the rendering are written to the frame buffer. Note the transition from "A", where the portion 1504 exists, to "B", where the portion 1504 is "peeled", to expose the portion 1506 of the scene 1500 associated with the at least one additional depth layer.

In the foregoing embodiment, the tests work from a front of the scene 1500 to a back of the scene 1500. Of course, the tests may also work from a back of the scene 1500 to a front of the scene 1500. Such back-to-front embodiment may be implemented by changing the decision 1406 of FIG. 14. As an option, various other operations (i.e. <, =, <=, =>, !=, etc.) may be used during the course of the aforementioned tests.

It is thus now readily apparent that, by the nature of these tests, it is important that the additional rendering pass be taken from the predetermined eye position associated with the previous rendering passes, since, for the peeling tests to be meaningful, the fragment coordinates compared by the tests must belong to the exact same point in space. That is, the multiple rendering passes must match up exactly at fragment coordinates, which implies rendering the scene from the same eye position.

Similarly, it is also readily apparent that, by the same nature of the tests, it is important that all the rendering passes use the exact same method for producing depth values, since a slight difference in depth values for otherwise matching fragments might cause incorrect results for the depth tests. Variance in depth values may arise due to using different methods for producing such coordinates.

The present tests thus output the nearest, second nearest, etc. fragments at each pixel. The present technique may take n passes over a scene in order to get n layers deep into the scene.

Embodiments for Application Program Interfaces

The following description is set forth in the context of OpenGL® which is commonly known to those of ordinary skill. More particularly, the following information is set forth in the context of the OpenGL® Specification Version 1.3, which is incorporated herein by reference in its entirety. It should be noted that, in the present description, OpenGL® API commands and tokens are prefixed by "gl" and "GL_," respectively. Also, OpenGL® extension commands and tokens are, by convention, often suffixed by letters indicating the company that proposed the extension, for example, "NV" or "_NV," respectively. When the context is clear, such prefixes and suffices are dropped for brevity and clarity.

Table 1 illustrates optional procedures and functions that may be employed in the context of the present embodiment

TABLE 1 void GenOcclusionQueriesNV(sizei n, uint *ids);
void DeleteOcclusionQueriesNV(sizei n, const uint *ids);
boolean IsOcclusionQueryNV(uint id);
void BeginOcclusionQueryNV(uint id);
void EndOcclusionQueryNV(void);
void GetOcclusionQueryivNV(uint id, enum pname, int *params);
void GetOcclusionQueryuivNV(uint id, enum pname, uint *params);

Table 2 illustrates various tokens that may optionally be employed in the context of the present embodiment.

TABLE 2

Accepted by the <cap> parameter of Enable, Disable, and IsEnabled, and by the <pname> parameter of GetBooleanv, GetIntegerv, GetFloatv, and GetDoublev:
    OCCLUSION_TEST_HP    0x8165
Accepted by the <pname> parameter of GetBooleanv, GetIntegerv,
  GetFloatv, and GetDoublev:
    OCCLUSION_TEST_RESULT_HP    0x8166
    PIXEL_COUNTER_BITS_NV    0x8864
    CURRENT_OCCLUSION_QUERY_ID_NV    0x8865
Accepted by the <pname> parameter of GetOcclusionQueryivNV and
  GetOcclusionQueryuivNV:
    PIXEL_COUNT_NV    0x8866
    PIXEL_COUNT_AVAILABLE_NV    0x8867

Additional information will now be set forth in a topic-by-topic format. This information is meant to expand upon what is commonly known to those of ordinary skill, as exemplified by the OpenGL® 1.3 specification.

Occlusion Tests and Queries

Occlusion testing keeps track of whether any pixels have passed the depth test. Such testing is enabled or disabled with the generic Enable and Disable commands using the symbolic constant OCCLUSION_TEST_HP. The occlusion test result is initially FALSE.

Occlusion queries can be used to track the exact number of fragments that pass the depth test. Occlusion queries are associated with occlusion query objects. The command void GenOcclusionQueriesNV(sizei n, uint *ids); returns n previously unused occlusion query names in ids. These names are marked as used, but no object is associated with them until the first time BeginOcclusionQueryNV is called on them. Occlusion queries contain one piece of state, a pixel count result. This pixel count result is initialized to zero when the object is created.

Occlusion queries are deleted by calling void DeleteOcclusionQueriesNV(sizei n, const uint *ids); ids contains n names of occlusion queries to be deleted. After an occlusion query is deleted, its name is again unused. Unused names in ids are silently ignored.

An occlusion query can be started and finished by calling the following commands set forth in Table 3.

TABLE 3 void BeginOcclusionQueryNV(uint id);
void EndOcclusionQueryNV(void);

If BeginOcclusionQueryNV is called with an unused id, that id is marked as used and associated with a new occlusion query object. If it is called while another occlusion query is active, an INVALID_OPERATION error is generated. If EndOcclusionQueryNV is called while no occlusion query is active, an INVALID_OPERATION error is generated. Calling either GenOCclusionQueriesNV or DeleteOcclusionQueriesNV while an occlusion query is active causes an INVALID_OPERATION error to be generated.

When EndOcclusionQueryNV is called, the current pixel counter is copied into the active occlusion query object's pixel count result. BeginOcclusionQueryNV resets the pixel counter to zero and the occlusion test result to FALSE.

Whenever a fragment reaches this stage and OCCLUSION_TEST_HP is enabled or an occlusion query is active, the occlusion test result is set to TRUE and the pixel counter is incremented. If the value of SAMPLE_BUFFERS is 1, then the pixel counter is incremented by the number of samples whose coverage bit is set; otherwise, it is always incremented by one. If the pixel counter overflows, i.e., exceeds the value $2^{PIXEL\_COUNTER\_BITS\_NV}-1$, its value becomes undefined. It is recommended, but not required, that implementations handle this overflow case by saturating at $2^{PIXEL\_COUNTER\_BITS\_NV}-1$ and incrementing no further.

The necessary state is a single bit indicating whether the occlusion test is enabled, a single bit indicating whether an occlusion query is active, the identifier of the currently active occlusion query, a counter of no smaller than 24 bits keeping track of the pixel count, and a single bit indicating the occlusion test result.

Display Lists

DeleteOcclusionQueriesNV, GenOcclusionQueriesNV, IsOcclusionQueryNV, GetOcclusionQueryivNV, and GetOcclusionQueryuivNV are not necessarily complied into display lists but are executed immediately.

More information on this topic may be found with reference to Chapter 5 of the OpenGL 1.3 Specification, which is incorporated herein by reference in its entirety.

Occlusion Test and Occlusion Queries

The occlusion test result can be queried using GetBooleanv, GetIntegerv, GetFloatv, or GetDoublev with a <pname> of OCCLUSION_TEST_RESULT_HP. Whenever such a query is performed, the occlusion test result is reset to FALSE and the pixel counter is reset to zero as a side effect.

Which occlusion query is active can be queried using GetBooleanv, GetIntegerv, GetFloatv, or GetDoublev with a <pname> of CURRENT_OCCLUSION_QUERY_ID_NV. This query returns the name of the currently active occlusion query if one is active, and zero otherwise.

The state of an occlusion query can be queried with the commands of Table 4.

TABLE 4 void GetOcclusionQueryivNV(uint id, enum pname, int *params);
void GetOcclusionQueryuivNV(uint id, enum pname, uint *params);

If the occlusion query object named by id is currently active, then an INVALID_OPERATION error is generated.

If <pname> is PIXEL_COUNT_NV, then the occlusion query's pixel count result is placed in params.

Often, occlusion query results will be returned asynchronously with respect to the host processor's operation. As a result, sometimes, if a pixel count is queried, the host must wait until the result is back. If <pname> is PIXEL_COUNT_AVAILABLE_NV, the value placed in params indicates whether or not such a wait would occur if the pixel count for that occlusion query were to be queried presently. A result of TRUE means no wait would be required; a result of FALSE means that some wait would occur. The length of this wait is potentially unbounded. It may always be true that if the result for one occlusion query is available, the result for all previous occlusion queries may also be available at that point in time.

More information on this topic may be found with reference to Chapter 6 of the OpenGL 1.3 Specification, which is incorporated herein by reference in its entirety.

GLX Protocol

Several new GL commands may be added in the present embodiment. Table 5 illustrates two rendering commands that are sent to the server as part of a glXRender request.

TABLE 5

| | | |
|---|---|---|
| BeginOcclusionQueryNV | | |
| 2 | 8 | rendering command length |
| 2 | ???? | rendering command opcode |
| 4 | CARD32 | id |
| EndOcclusionQueryNV | | |
| 2 | 4 | rendering command length |
| 2 | ???? | rendering command opcode |

The remaining five commands are non-rendering commands. These commands are sent separately (i.e., not as part of a glXRender or glXRenderLarge request), using the glXVendorPrivateWithReply request. Note Table 6.

TABLE 6

| | | |
|---|---|---|
| DeleteOcclusionQueriesNV | | |
| 1 | CARD8 | opcode (X assigned) |
| 1 | 17 | GLX opcode (glXVendorPrivateWithReply) |
| 2 | 4+n | request length |
| 4 | ???? | vendor specific opcode |
| 4 | GLX_CONTEXT_TAG | context tag |
| 4 | INT32 | n |
| n*4 | LISTofCARD32 | ids |
| GenOcclusionQueriesNV | | |
| 1 | CARD8 | opcode (X assigned) |
| 1 | 17 | GLX opcode (glXVendorPrivateWithReply) |
| 2 | 4 | request length |
| 4 | ???? | vendor specific opcode |
| 4 | GLX_CONTEXT_TAG | context tag |
| 4 | INT32 | n |
| => | | |
| 1 | 1 | reply |
| 1 | | unused |

TABLE 6-continued

| | | |
|---|---|---|
| 2 | CARD16 | sequence number |
| 4 | n | reply length |
| 24 | | unused |
| n*4 | LISTofCARD322 | queries |
| IsOcclusionQueryNV | | |
| 1 | CARD8 | opcode (X assigned) |
| 1 | 17 | GLX opcode (glXVendorPrivateWithReply) |
| 2 | 4 | request length |
| 4 | ???? | vendor specific opcode |
| 4 | GLX_CONTEXT_TAG | context tag |
| 4 | CARD32 | id |
| => | | |
| 1 | 1 | reply |
| 1 | | unused |
| 2 | CARD16 | sequence number |
| 4 | 0 | reply length |
| 4 | BOOL32 | return value |
| 20 | | unused |
| 1 | 1 | reply |
| GetOcclusionQueryivNV | | |
| 1 | CARD8 | opcode (X assigned) |
| 1 | 17 | GLX opcode (glXVendorPrivateWithReply) |
| 2 | 5 | request length |
| 4 | ???? | vendor specific opcode |
| 4 | GLX_CONTEXT_TAG | context tag |
| 4 | CARD32 | id |
| 4 | ENUM | pname |
| => | | |
| 1 | 1 | reply |
| 1 | | unused |
| 2 | CARD16 | sequence number |
| 4 | m | reply length, m=(n==1?0:n) |
| 4 | | unused |
| 4 | CARD32 | n |
| if (n=1) this follows: | | |
| 4 | INT32 | params |
| 12 | | unused |
| otherwise this follows: | | |
| 16 | | unused |
| n*4 | LISTofINT32 | params |
| GetOcclusionQueryuivNV | | |
| 1 | CARD8 | opcode (X assigned) |
| 1 | 17 | GLX opcode (glXVendorPrivateWithReply) |
| 2 | 5 | request length |
| 4 | ???? | vendor specific opcode |
| 4 | GLX_CONTEXT_TAG | context tag |
| 4 | CARD32 | id |
| 4 | ENUM | pname |
| => | | |
| 1 | 1 | reply |
| 1 | | unused |
| 2 | CARD16 | sequence number |
| 4 | m | reply length, m=(n==1?0:n) |
| 4 | | unused |
| 4 | CARD32 | n |
| if (n=1) this follows: | | |
| 4 | CARD32 | params |
| 12 | | unused |
| otherwise this follows: | | |
| 16 | | unused |
| n*4 | LISTofCARD32 | params |

Errors

Table 7 illustrates various errors that may be relevant to the present embodiment.

TABLE 7

The error INVALID_VALUE is generated if GenOcclusionQueriesNV is called where n is negative.
The error INVALID_VALUE is generated if DeleteOcclusionQueriesNV is called where n is negative.
The error INVALID_OPERATION is generated if GenOcclusionQueriesNV or DeleteOcclusionQueriesNV is called when an occlusion query is active.
The error INVALID_OPERATION is generated if BeginOcclusionQueryNV is called when an occlusion query is already active.
The error INVALID_OPERATION is generated if EndOcclusionQueryNV is called when an occlusion query is not active.
The error INVALID_OPERATION is generated if GetOcclusionQueryivNV or GetOcclusionQueryuivNV is called where id is not the name of an occlusion query.
The error INVALID_OPERATION is generated if GetOcclusionQueryivNV or GetOcclusionQueryuivNV is called where id is the name of the currently active occlusion query.
The error INVALID_ENUM is generated if GetOcclusionQueryivNV or GetOcclusionQueryuivNV is called where pname is not either PIXEL_COUNT_NV or PIXEL_COUNT_AVAILABLE_NV.
The error INVALID_OPERATION is generated if any of the commands defined in this extension is executed between the execution of Begin and the corresponding execution of End.

New States

Additional states that may be relevant to the present embodiment are set forth in Table 8.

TABLE 8

| Get Value | Type | Get Command | Initial Value | Description | Sec | Attribute |
|---|---|---|---|---|---|---|
| OCCLUSION_TEST_HP | B | IsEnabled | FALSE | occlusion test enable | 4.1.6A | enable |
| OCCLUSION_TEST_RESULT_HP | B | GetBooleanv | FALSE | occlusion test result | 4.1.6A | — |
| | B | GetBooleanv | FALSE | occlusion query active | 4.1.6A | — |
| CURRENT_OCCLUSION_QUERY_ID_NV | Z+ | GetIntegerv | 0 | occlusion query ID | 4.1.6A | — |
| | Z+ | — | 0 | pixel counter | 4.1.6A | — |

An additional dependent state that may be relevant to the present embodiment is set forth in Table 9.

TABLE 9

| Get Value | Type | Get Command | Minimum Value | Description | Sec | Attribute |
|---|---|---|---|---|---|---|
| PIXEL_COUNTER_BITS_NV | Z+ | GetIntegerv | 24 | Number of bits in | 6.1.13 | pixel counters |

Options

There may or may not be an object-based interface associated with the present embodiment. This may make the interface much simpler, and suited for direct rendering.

Moreover, an entry point analogous to glTestFenceNV need not necessarily be provided. It may be sufficient to have glGetOcclusionQueryivNV provide a query for whether the occlusion query result is back yet. Whereas it is interesting to poll fence objects, it is relatively less interesting to poll occlusion queries.

glGetOcclusionQueryuivNV may or may not be necessary, since makes using a 32-bit pixel count less painful.

Further, there may not necessarily be a limit on how many queries can be outstanding. This may make the extension much more difficult to spec and use. Allowing this does not necessarily add any significant implementation burden; and even if drivers have some internal limit on the number of outstanding queries, it is not expected that applications will need to know this to achieve optimal or near-optimal performance.

If glBeginOcclusionQueryNV is called when an occlusion query is already outstanding for a different object, this may or may not produce a GL_INVALID_OPERATION error.

HP_occlusion_test and NV_occlusion_query usage may be safely overlapped. Counting may enabled if one is either inside a glBeginOcclusionQueryNV or if GL_OCCLUSION_TEST_HP is enabled. The alternative (producing an error) may not necessarily work. It would require that glPopAttrib be capable of producing an error, which may be problematic.

glBeginOcclusionQueryNV, not necessarily glEndOcclusionQueryNV, resets the pixel counter and occlusion test result. This can avoid certain types of strange behavior where an occlusion query pixel count does not always correspond to the pixels rendered during the occlusion query. The specification may make sense the other way, but the behavior may be strange.

EndOcclusionQuery may not necessarily need to take any parameters. Providing, for example, an "id" parameter may be redundant, adding complexity for possibly no benefit. Only one query may be active at a time.

Various amounts of bits may be required for the pixel counter. In one embodiment, 24 bits may be required, which is enough to handle 8.7 full overdraws of a 1600×1200 window.

Overflows leave the pixel count undefined. Saturating is recommended, but not necessarily required. The ideal behavior really is to saturate. This may ensure that one always gets a "large" result when rendering many pixels. It also ensures that applications that want a boolean test can do one on its own, and not worry about the rare case where the result ends up exactly at zero from wrapping.

That being established, with 24 bits of pixel count required, it is not clear that this really matters. It may be better to be a bit permissive on this issue. In addition, even if saturation was required, the goal of having strictly defined behavior is still not really met.

Applications do not necessarily (or at least should not) check for some exact number of bits. If a multi-textured application is written that required that the number of texture units supported be exactly two, implementers of OpenGL® may be annoyed to find that the application did not run on, say, three-texture or four-texture hardware.

It is thus expected that applications may be doing a "greater than or equal to" check. An application may check for, say, at least 28 bits. This does not ensure defined behavior. Instead, it only ensures that once an overflow occurs (which may happen at any power of two), that overflow will be handled with saturation. This behavior still remains sufficiently unpredictable that the reasons for defining behavior in even rarely-used cases (preventing compatibility problems, for example) are unsatisfied.

To this end, saturation may be explicitly recommended in related specification language.

The interaction with multisample may vary. The pixel count may be the number of samples that pass, not the number of pixels. This may be true even if GL_MULTISAMPLE is disabled but GL_SAMPLE_BUFFERS is 1. It should be noted that the depth/stencil test optimization whereby implementations may choose to depth test at only one of the samples when GL_MULTISAMPLE is disabled does not cause this to become ill-specified, because the number of samples are being counted that are still alive after the depth test stage. The mechanism used to decide whether to kill or keep those samples may not necessarily be relevant.

The counting may occur at various stages (i.e. depth test, stencil test, etc.) In one embodiment, counting may occur immediately after both the depth and stencil tests, i.e., pixels that pass both. It should be noted that the depth test comes after the stencil test, so to say that it is the number that passes the depth test is reasonable; though it is often helpful to think of the depth and stencil tests as being combined, because the depth test result impacts the stencil operation used.

It may be guaranteed that occlusion queries return in order. In some instances, it makes sense to do this. If occlusion test X occurred before occlusion query Y, and the driver informs the application that occlusion query Y is done, the application can infer that occlusion query X is also done. For applications that poll, this allows them to do so with less effort.

Polling an occlusion query without a glFlush possibly may cause an infinite loop. If the result is requested, however, any flush required will be done automatically. It is only when polling occurs that this is a problem because there is no guarantee that a flush has occurred in the time since glEndOcclusionQueryNV. A related specification may be written to say that the result is only "available" if the value could be returned instantaneously.

This different from NV_fence, where FinishFenceNV can cause an application hang, and where TestFenceNV was also not guaranteed to ever finish.

To this end, if one uses GL_PIXEL_COUNT_AVAILABLE_NV, glFlush should be used, or the application may hang.

There need not necessarily be a "target" parameter to BeginOcclusionQuery.

Table 10 illustrates an example of how an application looks that uses the present embodiment.

TABLE 10

```
GLuint occlusionQueries [N];
GLuint pixelCount;
glGenOcclusionQueriesNV (N, occlusionQueries);
...
// before this point, render major occluders
glColorMask (GL_FALSE, GL_FALSE, GL_FALSE,
GL_FALSE);
    glDepthMask (GL_FALSE);
    // also disable texturing and any fancy shading
features
    for (i = 0; i < N; i++) {
glBeginOcclusionQueryNV(occlusionQueries [i]);
        // render bounding box for object i
        glEndOcclusionQueryNV ( );
    }
    // at this point, if possible, go and do some
other computation
    glColorMask (GL_TRUE, GL_TRUE, GL_TRUE, GL_TRUE);
    glDepthMask (GL_TRUE);
    // reenable other state
    for (i = 0; i < N; i++) {
glGetOcclusionQueryuivNV(occlusionQueries [i],
GL_PIXEL_COUNT_NV,
                            &pixelCount);
        if (pixelCount > 0) {
            // render object i
        }
    }
```

The present embodiment may or may not be useful for saving geometry, fill rate, or both. It may be most useful for saving geometry work, because for the cost of rendering a bounding box one can save rendering a normal object.

It is possible for the present embodiment to help in fill-limited situations, but using it may also hurt performance in such situations, because rendering the pixels of a bounding box is hardly free. In most situations, a bounding box may have more pixels than the original object.

One exception is that for objects rendered with multiple rendering passes, the first pass can be wrapped with an occlusion query with out spending resources. That is, the first pass may be rendered for all objects in the scene, and the number of pixels rendered on each object may be obtained. If zero pixels were rendered for an object, subsequent rendering passes may be skipped. This may be very useful in some cases.

Various things may be said about guaranteeing correctness when using occlusion queries, especially as it relates to invariance. Invariance may be critical to guarantee the correctness of occlusion queries. If occlusion queries go through a different code path than standard rendering, the pixels rendered may be different.

However, the invariance issues may difficult at best to solve. Because of the vagaries of floating-point precision, it is difficult to guarantee that rendering a bounding box will render at least as many pixels with equal or smaller z-values than the object itself would have rendered.

Likewise, many other aspects of rendering state tend to be different when performing an occlusion query. Color and depth writes are typically disabled, as are texturing, vertex programs, and any fancy per-pixel math. Thus, unless all these features have guarantees of invariance themselves (unlikely at best), requiring invariance for NV_occlusion_query may be futile.

The present embodiment is thus fully invariant with respect to whether an occlusion query is active. That is, it does not affect the operation of any other stage of the pipeline. When occlusion queries are being emulated on hardware that does not support them, via the emulation registry keys, using an occlusion query produces a software rasterization fallback, and in such cases, invariance can not necessarily be guaranteed.

Another problem that can threaten correctness is near and far clipping. If the bounding box penetrates the near clip plane, for example, it may be clipped away, reducing the number of pixels counted, when in fact the original object may have stayed entirely beyond the near clip plane. Whenever an algorithm is designed using occlusion queries, it may be important to be careful about the near and far clip planes.

Frame-to-frame coherency may possibly help applications using this extension get even higher performance. Usually, if an object is visible one frame, it may be visible the next frame, and if it is not visible, it may not be visible the next frame.

Of course, for most applications, "usually" may not be good enough. It is undesirable, but acceptable, to render an object that was not visible, because that only costs performance. It is generally unacceptable to not render an object that was visible.

The simplest approach is that visible objects may be checked every N frames (where, for example, N=5) to see if they have become occluded, while objects that were occluded last frame may be rechecked again in the current frame to guarantee that they are still occluded. This may reduce the number of wasteful occlusion queries by a factor of almost N.

It may also pay to do a raycast on the central processing unit in order to try to prove that an object is visible. After all, occlusion queries are only one of many items that may be used to decide whether objects are visible or invisible. They are not necessarily an excuse to skip frustum culling, or pre-computing visibility using portals for static environments, or other standard visibility techniques.

In general, though, taking advantage of frame-to-frame coherency in occlusion query code may be essential to getting the best possible performance.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents. The order of elements within claims does not indicate any particular order of steps or operations.

What is claimed is:

1. A method for accelerating graphics processing utilizing a graphics application program interface, comprising:

processing graphics data in a graphics system with components including a geometry processing module and a pixel processing module; and interfacing with the graphics system with the graphics application program interface;

wherein the graphics application program interface accepts one or more first occlusion queries followed by a second occlusion query, the second occlusion query being at least partially processed by the graphics system before a final result of any one of the first occlusion queries is computed by the graphics system;

wherein the graphics application program interface substantially prevents breaks in the processing of the graphics data in the geometry processing module and the pixel processing module of the graphics system.

2. The method as recited in claim 1, wherein the geometry processing module and pixel processing module are hardware.

3. The method as recited in claim 1, wherein the geometry processing module and the pixel processing module include software run on separate programmable processors.

4. The method as recited in claim 1, wherein the geometry processing module and the pixel processing module include software run on the same programmable processor.

5. The method as recited in claim 1, wherein the occlusion queries each include a bounding volume.

6. The method as recited in claim 5, wherein writes to a frame buffer are disabled prior to the processing of the occlusion queries.

7. The method as recited in claim 6, wherein writes to the frame buffer are enabled after the processing of the occlusion queries.

8. The method as recited in claim 1, and further comprising tracking visibility information utilizing the graphics application program interface.

9. The method as recited in claim 8, wherein the visibility information includes a number of visible pixels.

10. The method as recited in claim 8, wherein the visibility information includes a number of visible samples.

11. The method as recited in claim 8, wherein the visibility information includes a number of visible triangles.

12. The method as recited in claim 8, wherein the visibility information includes a number of visible polygons.

13. The method as recited in claim 12, wherein the visibility information includes a number of visible front-facing polygons.

14. The method as recited in claim 8, and further comprising comparing the visibility information associated with an object with a predetermined threshold.

15. The method as recited in claim 14, and further comprising conditionally rendering the object based on the comparison.

16. The method as recited in claim 8, and further comprising selecting the type of visibility information.

17. The method as recited in claim 8, and further comprising selecting a level-of-detail based on the visibility information.

18. The method as recited in claim 17, and further comprising rendering an object associated with the visibility information at the selected level-of-detail.

19. The method as recited in claim 1, and further comprising rendering a bounding volume.

20. The method as recited in claim 19, wherein the rendering is terminated based on a threshold.

21. The method as recited in claim 20, wherein the rendering is terminated based on a comparison involving the threshold and visibility information tracked utilizing the graphics application program interface.

22. The method as recited in claim 20, and further comprising selecting a parameter to which the threshold is applied.

23. The method as recited in claim 19, wherein the rendering is part of a depth peeling operation.

24. The method as recited in claim 1, further comprising: collecting a plurality of constraining depth layers, rendering a scene, performing multiple tests involving the constraining depth layers and results of rendering the scene, collecting information about at least one depth layer utilizing the multiple tests, and utilizing the information relating to the at least one depth layer.

25. The method as recited in claim 1, further comprising: collecting information relating to a plurality of constraining depth layers, collecting information relating to at least one additional depth layer, and utilizing the information relating to the constraining depth layers and the information relating to the at least one additional depth layer to improve processing in the graphics pipeline.

26. The method as recited in claim 1, wherein the graphics application program interface is used to generate an effect based on visibility information.

27. The method as recited in claim 26, wherein the graphics application program interlace is used to perform the occlusion queries, the results of the occlusion queries being used as a condition for generating the effect.

28. The method as recited in claim 26, wherein the effect includes a lens flare.

29. The method as recited in claim 28, wherein the lens flare is modulated based on the visibility information.

30. The method as recited in claim 26, wherein the effect includes a halo.

31. The method as recited in claim 30, wherein the halo is modulated based on the visibility information.

32. The method as recited in claim 1, and further comprising maintaining a visible object list indicating which of a plurality of objects are visible during the processing.

33. The method as recited in claim 32, wherein objects are added to the visible object list based on visibility information tracked utilizing the graphics application program interface.

34. The method as recited in claim 32, and further comprising rendering the objects during multiple rendering passes utilizing the visible object list.

35. The method as recited in claim 34, and further comprising removing objects from the visible object list based on visibility information tracked utilizing the graphics application program interface.

36. A computer program product for accelerating graphics processing utilizing a graphics application program interface, comprising:
   computer code for processing graphics data in a graphics system with components including a central processing unit, a geometry processing module, and a pixel processing module; and
   computer code for interfacing with the graphics system with the graphics application program interface;
   wherein the graphics application program interface accepts one or more first occlusion queries followed by a second occlusion query, the second occlusion query being at least partially processed by the graphics system before a final result of any one of the first occlusion queries is completed by the graphics system;
   wherein the graphics application program interface substantially prevents breaks in the processing of the graphics data in the geometry processing module and the pixel processing module of the graphics system.

37. A system for accelerating graphics processing, comprising:
   a graphics apparatus with components including a central processing unit, a geometry processing module, and a pixel processing module for processing graphics data; and
   wherein a graphics application program interface accepts one or more first occlusion queries followed by a second occlusion query, the second occlusion query being at least partially processed by the system before a final result of any one of the first occlusion queries is completed by the system;
   wherein the graphics application program interface substantially prevents breaks in the processing of the graphics data in the geometry processing module and the pixel processing module of the graphics system.

38. A graphics application program interface for accelerating graphics processing by interfacing with a graphics system capable of processing graphics data, wherein the graphics application program interface accepts a plurality of occlusion queries before returning a result of any one of the occlusion queries;

wherein the graphics application program interface substantially prevents breaks in the processing of the graphics data in a geometry processing module and a pixel processing module of the graphics system.

39. A graphics application program interface for accelerating graphics processing by interfacing with a graphics system capable of processing graphics data, wherein the graphics application program interface prevents breaks in the processing of the graphics data in a geometry processing module and a pixel processing module of the graphics system by processing graphic data separate from a plurality of occlusion queries while processing the occlusion queries.

40. A method for accelerating graphics processing utilizing a graphics application program interface in conjunction with a hardware graphics pipeline, comprising:

creating a plurality of occlusion query objects;
rendering a plurality of occluder objects of a frame;
disabling writes to a frame buffer;
performing an occlusion query for each of the occlusion query objects by:
selecting one of the occlusion query objects, and rendering a bounding volume of geometry;
enabling writes to the frame buffer;
selecting one of the occlusion query objects;
identifying a result of the occlusion query associated with the selected occlusion query object;
determining whether the selected occlusion query object is visible using the result of the occlusion query associated with the selected occlusion query object;
rendering the selected occlusion query object if it is determined that the selected occlusion query object is visible; and
repeating the selecting, the identifying, the determining, and the rendering after the occlusion query for each of the occlusion query objects;
wherein the graphics application program interface substantially prevents breaks in the processing of graphics data in a geometry processing module and a pixel processing module of the hardware graphics pipeline.

41. A method for accelerating graphics processing utilizing a graphics application program interface, comprising:

receiving a first set of graphics commands from a computer program, the first set corresponding to a first occlusion query, the first set being processed in a hardware graphics pipeline;
after the receiving of the first set, receiving a second set of graphics commands from the computer program, the second set corresponding to a second occlusion query, the second set being processed in the hardware graphics pipeline;
receiving a third set of graphics commands after the second set, the third set being at least partially processed in the hardware graphics pipeline before a result for the first occlusion query is determined; and
saving the result for the first occlusion query and a result for the second occlusion query, the saved results being accessible by the computer program;

wherein the graphics application program interface substantially prevents breaks in the processing of graphics data in a geometry processing module and a pixel processing module of the hardware graphics pipeline.

42. The method as recited in claim 41, wherein the occlusion queries each include rendering a bounding volume.

43. The method as recited in claim 42, wherein writes to a frame buffer are disabled prior to the processing of the occlusion queries.

44. The method as recited in claim 43, wherein writes to the frame buffer are enabled after the processing of the occlusion queries.

45. The method as recited in claim 41, and further comprising tracking visibility information utilizing the graphics application program interface.

46. The method as recited in claim 45, wherein the visibility information includes a number of visible pixels.

47. The method as recited in claim 45, wherein the visibility information includes a number of visible samples.

48. The method as recited in claim 45, wherein the visibility information includes a number of visible triangles.

49. The method as recited in claim 45, wherein the visibility information includes a number of visible polygons.

50. The method as recited in claim 49, wherein the visibility information includes a number of visible front-facing polygons.

51. The method as recited in claim 45, and further comprising comparing the visibility information associated with an object with a predetermined threshold.

52. The method as recited in claim 51, and further comprising conditionally rendering the object based on the comparison.

53. The method as recited in claim 45, and further comprising selecting the type of visibility information.

54. The method as recited in claim 45, and further comprising selecting a level-of-detail based on the visibility information.

55. The method as recited in claim 54, and further comprising rendering an object associated with the visibility information at the selected level-of-detail.

56. The method as recited in claim 41, and further comprising rendering a bounding volume.

57. The method as recited in claim 56, wherein the rendering is terminated based on a threshold.

58. The method as recited in claim 57, wherein the rendering is terminated based on a comparison involving the threshold and visibility information tracked utilizing the graphics application program interface.

59. The method as recited in claim 57, and further comprising selecting a parameter to which the threshold is applied.

60. The method as recited in claim 56, wherein the rendering is part of a depth peeling operation.

61. The method as recited in claim 56, wherein the rendering includes collecting a plurality of constraining depth layers, rendering a scene, performing multiple tests involving the constraining depth layers and results of rendering the scene, collecting information about at least one depth layer utilizing the multiple tests, and utilizing the information relating to the at least one depth layer.

62. The method as recited in claim 56, wherein the rendering includes collecting information relating to a plurality of constraining depth layers, collecting information relating to at least one additional depth layer, and utilizing the information relating to the constraining depth layers and the information relating to the at least one additional depth layer to improve processing in the graphics pipeline.

63. The method as recited in claim 41, wherein the graphics application program interface is used to generate an effect based on visibility information.

64. The method as recited in claim 63, wherein the graphics application program interface is used to perform the occlusion queries, the results of the occlusion queries being used as a condition for generating the effect.

65. The method as recited in claim 63, wherein the effect includes a lens flare.

66. The method as recited in claim 65, wherein the lens flare is modulated based on the visibility information.

67. The method as recited in claim 63, wherein the effect includes a halo.

68. The method as recited in claim 67, wherein the halo is modulated based on the visibility information.

69. The method as recited in claim 41, and further comprising maintaining a visible object list indicating which of a plurality of objects are visible during the processing utilizing graphics application program interface.

70. The method as recited in claim 69, wherein objects are added to the visible object list based on visibility information tracked utilizing the graphics application program interface.

71. The method as recited in claim 69, and further comprising rendering the objects during multiple rendering passes utilizing the visible object list.

72. The method as recited in claim 71, and further comprising removing objects from the visible object list based on visibility information tracked utilizing the graphics application program interface.

* * * * *

UNITED STATES PATENT AND TRADEMARK OFFICE
CERTIFICATE OF CORRECTION

| | |
|---|---|
| PATENT NO. | : 6,952,206 B1 |
| APPLICATION NO. | : 10/218091 |
| DATED | : October 4, 2005 |
| INVENTOR(S) | : Matthew Craighead |

It is certified that error appears in the above-identified patent and that said Letters Patent is hereby corrected as shown below:

In the claims:
Claim 27, col. 28, line 10; please replace "interlace" with --interface--.

Signed and Sealed this
Twelfth Day of March, 2013

Teresa Stanek Rea
*Acting Director of the United States Patent and Trademark Office*